US010883430B2

(12) United States Patent
Yasui et al.

(10) Patent No.: US 10,883,430 B2
(45) Date of Patent: Jan. 5, 2021

(54) EGR CONTROL APPARATUS AND EGR CONTROL METHOD FOR INTERNAL COMBUSTION ENGINE

(71) Applicants: HONDA MOTOR CO., LTD., Tokyo (JP); Delphi Technologies IP Limited, St. Michael (BB)

(72) Inventors: Yuji Yasui, Wako (JP); Toshiharu Takahashi, Tokyo (JP)

(73) Assignees: HONDA MOTOR CO., LTD., Tokyo (JP); DELPHI TECHNOLOGIES IP LIMITED, St. Michael (BB)

( * ) Notice: Subject to any disclaimer, the term of this patent is extended or adjusted under 35 U.S.C. 154(b) by 283 days.

(21) Appl. No.: 16/087,703

(22) PCT Filed: Mar. 25, 2016

(86) PCT No.: PCT/JP2016/059609
§ 371 (c)(1),
(2) Date: Sep. 24, 2018

(87) PCT Pub. No.: WO2017/163397
PCT Pub. Date: Sep. 28, 2017

(65) Prior Publication Data
US 2020/0300187 A1 Sep. 24, 2020

(51) Int. Cl.
*B60T 7/12* (2006.01)
*F02D 41/00* (2006.01)
(Continued)

(52) U.S. Cl.
CPC ......... *F02D 41/0072* (2013.01); *F02M 26/05* (2016.02); *F02D 41/0077* (2013.01);
(Continued)

(58) Field of Classification Search
CPC ............ F02D 35/0015; F02D 41/0047; F02D 41/005; F02D 41/0052; F02D 41/0062;
(Continued)

(56) References Cited

U.S. PATENT DOCUMENTS

2011/0308503 A1* 12/2011 Yasui .................... F02D 41/005
123/568.21
2011/0313634 A1* 12/2011 Yasui .................. F02D 41/1402
701/102
(Continued)

FOREIGN PATENT DOCUMENTS

DE 10 2012 103 998 A1 11/2012
JP 2008-38627 A 2/2008
(Continued)

OTHER PUBLICATIONS

Extended (Supplementary) European Search Report dated Mar. 4, 2019, issued in counterpart EP application 16895432.9. (6 pages).
(Continued)

*Primary Examiner* — John Kwon
(74) *Attorney, Agent, or Firm* — Westerman, Hattori, Daniels & Adrian, LLP

(57) ABSTRACT

An EGR control apparatus for the engine includes an ECU. The ECU calculates a LP-side correction coefficient Kcor_LP and a HP-side correction coefficient Kcor_HP such that they include a LP-side FB correction value Dfb_LP and a HP-side FB correction value Dfb_HP that are calculated using equations (9) and (17) such that an absolute value of an EGR amount error E_egr is reduced, and a LP-side learned value CorMAP_LP/HP-side learned value Cor-MAP_HP learned when a LP ratio R_LP=1/R_LP=0 holds, calculates a target LP opening θ_LP_dmd and a target HP opening θ_HP_dmd using the LP-side correction coefficient Kcor_LP and the HP-side correction coefficient Kcor_HP, and controls a LP opening θ_LP and a HP opening θ_HP
(Continued)

such that they become equal to the target LP opening $\theta\_LP\_dmd$ and the target HP opening $\theta\_HP\_dmd$.

10 Claims, 13 Drawing Sheets

(51) Int. Cl.
  *F02M 26/05* (2016.01)
  *F02D 21/08* (2006.01)
  *F02M 26/06* (2016.01)
(52) U.S. Cl.
  CPC .............. *F02D 2021/083* (2013.01); *F02D 2200/0406* (2013.01); *F02D 2200/101* (2013.01); *F02M 26/06* (2016.02)
(58) Field of Classification Search
  CPC ........... F02D 41/0072; F02D 2021/083; F02D 2021/086; F02M 26/49
  USPC ....... 701/101, 108, 114; 123/568.11, 568.16, 123/568.18
  See application file for complete search history.

(56) References Cited

U.S. PATENT DOCUMENTS

| | | | |
|---|---|---|---|
| 2012/0090584 A1 | 4/2012 | Jung | |
| 2012/0117011 A1* | 5/2012 | Hashimoto | .......... G05B 13/027 706/23 |
| 2016/0230689 A1* | 8/2016 | Yamashita | ............ F02D 35/025 |

FOREIGN PATENT DOCUMENTS

| | | |
|---|---|---|
| JP | 2008-175131 A | 7/2008 |
| JP | 2011-522159 A | 7/2011 |
| JP | 2012-87779 A | 5/2012 |
| JP | 2012-237290 A | 12/2012 |
| WO | 2008/087513 A1 | 7/2008 |
| WO | 2009/148917 A2 | 12/2009 |

OTHER PUBLICATIONS

International Search Report dated Jun. 14, 2016, issued in counterpart International Application No. PCT/JP2016/059609, with English Translation. (4 pages).

* cited by examiner

EGR CONTROL APPARATUS AND EGR CONTROL METHOD FOR INTERNAL COMBUSTION ENGINE

TECHNICAL FIELD

The present invention relates to an EGR control apparatus and an EGR control method for an internal combustion engine that includes a low-pressure EGR device and a high-pressure EGR device, the EGR control apparatus and the EGR control method controlling EGR amounts by the low-pressure EGR device and the high-pressure EGR device.

BACKGROUND ART

Conventionally, as an EGR control apparatus for an internal combustion engine that includes a low-pressure EGR device and a high-pressure EGR device, there has been known one disclosed e.g. in PTL 1. In this engine, part of burned gases is recirculated into an intake passage as low-pressure EGR gases via a low-pressure EGR valve of the low-pressure EGR device, and part of the burned gases is recirculated into cylinders as high-pressure EGR gases through a path shorter than a path for the low-pressure EGR gases, via a high-pressure EGR valve of a high-pressure EGR device.

In the case of this control apparatus, a differential pressure between pressures at opposite ends of a low-pressure EGR passage is detected by a differential pressure sensor, a low-pressure EGR amount is calculated from this differential pressure and a degree of opening of the low-pressure EGR valve, and a high-pressure EGR amount is calculated from a setting of a differential pressure between pressures at opposite ends of a high-pressure EGR passage and a degree of opening of the high-pressure EGR valve. Then, an EGR ratio (ratio of the low-pressure EGR amount to a total EGR amount) is calculated from the low-pressure EGR amount and the high-pressure EGR amount, and when a difference between the EGR ratio and a target EGR ratio is larger than a predetermined value, the degree of opening of the low-pressure EGR valve is corrected such that the target EGR ratio is obtained (paragraph numbers [0062] to [0067]).

CITATION LIST

Patent Literature

[PTL 1] Japanese Laid-Open Patent Publication (Kokai) No. 2008-38627

SUMMARY OF INVENTION

Technical Problem

According to the above-described EGR control apparatus disclosed in PTL 1, there arise the following problems: Since the degree of opening of the high-pressure EGR valve is not corrected but only the degree of opening of the low-pressure EGR valve is corrected, in a case where sludge or the like is formed on an inner wall surface of the high-pressure EGR passage or in the high-pressure EGR valve of the high-pressure EGR device, it is impossible to properly compensate for the adverse influence of the sludge or the like, so that an air-fuel ratio can deviate from an optimum value, which causes an increase of NOx in exhaust gases, degradation of fuel economy, and lowering of knock suppression ability.

Particularly in the case of the engine disclosed in PTL 1, since the high-pressure EGR device recirculates exhaust gases upstream of a filter for trapping particulates, a state in which the amount of particulates and unburned components in exhaust gases is large is more liable to occur than in the low-pressure EGR device that recirculates exhaust gases downstream of the filter. This causes sludge or the like to be readily formed. As a result, the above-described problems become more conspicuous.

Further, since only the degree of opening of the low-pressure EGR valve is corrected, although the EGR ratio can be controlled to the target EGR ratio, the total EGR amount varies, so that the above-mentioned problems caused by deviation of the air-fuel ratio become more conspicuous. In addition to this, also in a case where calculation errors of the low-pressure EGR amount and the high-pressure EGR amount have occurred due to aging of the low-pressure EGR device and the high-pressure EGR device and variation between individual products of the devices, the control accuracy of the EGR amounts by the low-pressure EGR device and the high-pressure EGR device is lowered, so that the above-mentioned problems become more conspicuous.

The present invention has been made to provide a solution to the above-described problems, and an object thereof is to provide an EGR control apparatus and an EGR control method for an internal combustion engine, which are capable of accurately controlling EGR amounts by a low-pressure EGR device and a high-pressure EGR device, and are capable of improving both of reduction performance of harmful ingredients (NOx) of exhaust gases and fuel economy performance.

Solution to Problem

To attain the above object, the invention according to claim 1 is an EGR control apparatus 1 for an internal combustion engine 3 in which part of burned gases is recirculated into an intake passage 5 via a low-pressure EGR valve (LP-EGR valve 11c) of a low-pressure EGR device (LP-EGR device 11), and part of the burned gases is recirculated into cylinders 3a through a path shorter than the low-pressure EGR device (LP-EGR device 11) via a high-pressure EGR valve (HP-EGR valve 12c) of a high-pressure EGR device (HP-EGR device 12), comprising error parameter calculation means (ECU 2, EGR amount error calculation section 50) for calculating an error parameter (EGR amount error E_egr) indicating an error of a total EGR amount which is a total sum of a low-pressure EGR amount as an amount of gasses recirculated by the low-pressure EGR device (LP-EGR device 11) and a high-pressure EGR amount as an amount of gasses recirculated by the high-pressure EGR device (HP-EGR device 12), correction value calculation means (ECU 2, correction coefficient calculation section 60) for calculating a low pressure-side correction value (LP-side correction coefficient Kcor_LP) and a high pressure-side correction value (HP-side correction coefficient Kcor_HP) such that an absolute value of the error of the total EGR amount indicated by the error parameter is reduced, target opening degree calculation means (ECU 2, target opening calculation section 70) for calculating a target low-pressure EGR opening degree (target LP opening θ_LP_dmd) serving as a target of a degree of opening of the low-pressure EGR valve (LP-EGR valve 11c), and a target high-pressure EGR opening degree (target HP opening θ_HP_dmd) serving as a target of a degree of opening of the high-pressure EGR valve (HP-EGR valve 12c), using the low pressure-side correction value (LP-side correction coefficient Kcor_LP) and the high pressure-side correction value (HP-side correction coefficient Kcor_HP), respectively, and EGR control means (ECU 2, opening controller 80) for controlling the degree of opening (LP opening θ_LP) of the low-pressure EGR valve and the degree of opening (HP opening θ_HP) of the high-pressure EGR valve such that the degree of opening (LP opening θ_LP) of the low-pressure EGR valve and the degree of opening (HP opening θ_HP) of the high-pressure EGR valve become equal to the target low-pressure EGR opening degree (target LP opening θ_LP_dmd) and the target high-pressure EGR opening degree (target HP opening θ_HP_dmd), respectively, wherein at least one of the low pressure-side correction value (LP-side correction coefficient Kcor_LP) and the high pressure-side correction value (HP-side correction coefficient Kcor_HP) is configured to include a feedback correction value (LP-side FB correction value Dfb_LP, HP-side FB correction value Dfb_HP) that is calculated using a predetermined feedback control algorithm [equations (9), (17)] such that an absolute value of the error is reduced, and a learned value (LP-side learned value CorMAP_LP, HP-side learned value CorMAP_HP) that is learned when a ratio between the low-pressure EGR amount and the high-pressure EGR amount in the total EGR amount is in a predetermined state.

According to this EGR control apparatus, the error parameter indicating the error of the total EGR amount which is the total sum of the low-pressure EGR amount as the amount of gasses recirculated by the low-pressure EGR device and the high-pressure EGR amount as the amount of gasses recirculated by the high-pressure EGR device is calculated, the low pressure-side correction value and the high pressure-side correction value are calculated such that the absolute value of the error of the total EGR amount indicated by the error parameter is reduced, the target low-pressure EGR opening degree serving as the target of a degree of opening of the low-pressure EGR valve, and the target high-pressure EGR opening degree serving as the target of a degree of opening of the high-pressure EGR valve are calculated using the low pressure-side correction value and the high pressure-side correction value, respectively, and the degree of opening of the low-pressure EGR valve and the degree of opening of the high-pressure EGR valve are controlled such that the degree of opening of the low-pressure EGR valve and the degree of opening of the high-pressure EGR valve become equal to the target low-pressure EGR opening degree and the target high-pressure EGR opening degree, respectively. In this case, at least one of the low pressure-side correction value and the high pressure-side correction value is configured to include the feedback correction value that is calculated using the predetermined feedback control algorithm such that the absolute value of the error is reduced, and the learned value that is learned when the ratio between the low-pressure EGR amount and the high-pressure EGR amount in the total EGR amount is in the predetermined state. Therefore, for example, in a case where one of the low pressure-side correction value and the high pressure-side correction value is configured to include the feedback correction value and the learned value, it is possible to improve the control accuracy of one of the degree of opening of the low-pressure EGR valve and the degree of opening of the high-pressure EGR valve. On the other hand, in a case where both of the low pressure-side correction value and the high pressure-side correction value are configured to include the feedback correction value and the learned value, it is possible to improve the control accuracy of both the degree of opening of the low-pressure EGR valve and the degree of opening of the high-pressure EGR valve. As a result, it is possible to accurately control the EGR amount(s) by the low-pressure EGR device and/or the high-pressure EGR device, so that it is possible to improve both of reduction performance of harmful ingredients (NOx) of exhaust gases and fuel economy performance. Further, in a case where the engine is a gasoline engine, it is possible to improve the knock suppression ability.

The invention according to claim 2 is the EGR control apparatus 1 according to claim 1, wherein the high pressure-side correction value (HP-side correction coefficient Kcor_HP) is configured to include the feedback correction value (HP-side FB correction value Dfb_HP) and the learned value (HP-side learned value CorMAP_HP), and wherein the predetermined state is a state in which a ratio of the high-pressure EGR amount to the total EGR amount (1−R_LP) is not smaller than a first predetermined value (value of 1).

According to this EGR control apparatus, the high pressure-side correction value is configured to include the feedback correction value and the learned value, and the learned value is learned when the ratio of the high-pressure EGR amount to the total EGR amount is in a state not smaller than the first predetermined value, and hence by properly setting the first predetermined value, it is possible to learn the learned value under a condition that the ratio of the high-pressure EGR amount to the total EGR amount is large, whereby it is possible to improve the calculation accuracy of the high pressure-side correction value. As a result, it is possible to further improve the control accuracy of the EGR amount by the high-pressure EGR device.

The invention according to claim 3 is the EGR control apparatus 1 according to claim 1 or 2, wherein the low pressure-side correction value (LP-side correction coefficient Kcor_LP) is configured to include the feedback correction value (LP-side FB correction value Dfb_LP) and the learned value (LP-side learned value CorMAP_LP), and wherein the predetermined state is a state in which a ratio of the low-pressure EGR amount to the total EGR amount (LP ratio R_LP) is not smaller than a second predetermined value (value of 1).

According to this EGR control apparatus, the low pressure-side correction value is configured to include the feedback correction value and the learned value, and the learned value is learned when the ratio of the low-pressure EGR amount to the total EGR amount is in a state not smaller than the second predetermined value, and hence by properly setting the second predetermined value, it is possible to learn the learned value under a condition that the ratio of the low-pressure EGR amount to the total EGR amount is large, whereby it is possible to improve the calculation accuracy of the low pressure-side correction value. As a result, it is possible to further improve the control accuracy of the EGR amount by the low-pressure EGR device.

The invention according to claim 4 is the EGR control apparatus 1 according to any one of claims 1 to 3, wherein the learned value (LP-side learned value CorMAP_LP, HP-side learned value CorMAP_HP) is calculated such that an absolute value of the feedback correction value (LP-side learned value CorMAP_LP, HP-side learned value CorMAP_HP) is reduced.

As in the invention according to claim 1, in the case where the low pressure-side correction value and/or the high pressure-side correction value are/is configured to include the feedback correction value that is calculated such that the absolute value of the error is reduced, if the learned value is calculated such that the absolute value of the error is reduced, there is a fear that the learned value and the feedback correction value interfere with each other, thereby making a control system unstable. On the other hand, according to the EGR control apparatus according to claim 4, although the feedback correction value is calculated such that the absolute value of the error is reduced, the learned value is calculated such that the absolute value of the feedback correction value is reduced, and hence the learned value is calculated in a state provided with a function of reducing the absolute value of the error while avoiding interference between the learned value and the feedback correction value. As a result, it is possible to obtain the operations and effects of the invention according to claim 1 while ensuring the stability of the control system.

The invention according to claim 5 is the EGR control apparatus 1 according to any one of claims 1 to 4, wherein the learned value (LP-side learned value CorMAP_LP, HP-side learned value CorMAP_HP) is calculated using a model value that is calculated from a correlation model (FIGS. 9, 10) defining a relationship between at least one pair of a pair of correlation parameters (target LP opening θ_LP_dmd, target HP opening θ_HP_dmd) having correlations with the high-pressure EGR amount and the low-pressure EGR amount, respectively, and a pair of flow rate parameters (LP-side flow rate parameter Sf_LP, HP-side flow rate parameter Sf_HP) having correlations with the high-pressure EGR amount and the low-pressure EGR amount, respectively, and the model value (LP opening weight function Wp_LP_i, LP-side flow rate weight function Wf_LP_i, HP opening weight function Wp_HP_i, HP-side flow rate weight function Wf_HP_i).

According to this EGR control apparatus, the learned value is calculated using the model value that is calculated from the correlation model defining the relationship between at least one pair of the pair of correlation parameters having correlations with the high-pressure EGR amount and the low-pressure EGR amount, respectively, and the pair of flow rate parameters having correlations with the high-pressure EGR amount and the low-pressure EGR amount, respectively, and the model value, so that even when it is impossible to update the learned value during execution of recirculation of exhaust gases by both of the low-pressure EGR device and the high-pressure EGR device, and in a transient state where required high-pressure and low-pressure EGR amounts change, it is possible to accurately calculate the learned value. As a result, even in the transient state, it is possible to control the EGR amount(s) by the low-pressure EGR device and/or the high-pressure EGR device with high accuracy, whereby it is possible to ensure both of reduction performance of harmful ingredients (NOx) of exhaust gases and fuel economy performance at a high level. In addition to this, in a case where the engine is a gasoline engine, it is possible to ensure a high-level knock suppression ability.

Further, to attain the above-described object, the invention according to claim 6 is an EGR control method for an internal combustion engine 3 in which part of burned gases is recirculated into an intake passage 5 via a low-pressure EGR valve (LP-EGR valve 11c) of a low-pressure EGR device (LP-EGR device 11), and part of the burned gases is recirculated into cylinders 3a through a path shorter than the low-pressure EGR device (LP-EGR device 11) via a high-pressure EGR valve (HP-EGR valve 12c) of a high-pressure EGR device (HP-EGR device 12), comprising calculating an error parameter (EGR amount error E_egr) indicating an error of a total EGR amount which is a total sum of a low-pressure EGR amount as an amount of gasses recirculated by the low-pressure EGR device (LP-EGR device 11) and a high-pressure EGR amount as an amount of gasses recirculated by the high-pressure EGR device (HP-EGR device 12) (EGR amount error calculation section 50), calculating a low pressure-side correction value (LP-side correction coefficient Kcor_LP) and a high pressure-side correction value (HP-side correction coefficient Kcor_HP) such that an absolute value of the error of the total EGR amount indicated by the error parameter is reduced (correction coefficient calculation section 60), calculating a target low-pressure EGR opening degree (target LP opening θ_LP_dmd) serving as a target of a degree of opening of the low-pressure EGR valve (LP-EGR valve 11c), and a target high-pressure EGR opening degree (target HP opening θ_HP_dmd) serving as a target of a degree of opening of the high-pressure EGR valve (HP-EGR valve 12c), using the low pressure-side correction value (LP-side correction coefficient Kcor_LP) and the high pressure-side correction value (HP-side correction coefficient Kcor_HP), respectively (target opening calculation section 70), and controlling the degree of opening (LP opening θ_LP) of the low-pressure EGR valve and the degree of opening (HP opening θ_HP) of the high-pressure EGR valve such that the degree of opening (LP opening θ_LP) of the low-pressure EGR valve and the degree of opening (HP opening θ_HP) of the high-pressure EGR valve become equal to the target low-pressure EGR opening degree (target LP opening θ_LP_dmd) and the target high-pressure EGR opening degree (target HP opening θ_HP_dmd), respectively (opening controller 80), wherein at least one of the low pressure-side correction value (LP-side correction coefficient Kcor_LP) and the high pressure-side correction value (HP-side correction coefficient Kcor_HP) is configured to include a feedback correction value (LP-side FB correction value Dfb_LP, HP-side FB correction value Dfb_HP) that is calculated using a predetermined feedback control algorithm [equations (9), (17)] such that an absolute value of the error is reduced, and a learned value (LP-side learned value CorMAP_LP, HP-side learned value CorMAP_HP) that is learned when a ratio between the low-pressure EGR amount and the high-pressure EGR amount in the total EGR amount is in a predetermined state.

According to this EGR control method, it is possible to obtain the same operations and effects as provided by the invention according to claim 1.

The invention according to claim 7 is the EGR control method according to claim 6, wherein the high pressure-side correction value (HP-side correction coefficient Kcor_HP) is configured to include the feedback correction value (HP-side FB correction value Dfb_HP) and the learned value (HP-side learned value CorMAP_HP), and wherein the predetermined state is a state in which a ratio of the high-pressure EGR amount to the total EGR amount (1−R_LP) is not smaller than a first predetermined value (value of 1).

According to this EGR control method, it is possible to obtain the same operations and effects as provided by the invention according to claim 2.

The invention according to claim 8 is the EGR control method according to claim 6 or 7, wherein the low pressure-side correction value (LP-side correction coefficient Kcor_LP) is configured to include the feedback correction value (LP-side FB correction value Dfb_LP) and the learned value (LP-side learned value CorMAP_LP), and wherein the predetermined state is a state in which a ratio of the low-pressure EGR amount to the total EGR amount (LP ratio R_LP) is not smaller than a second predetermined value (value of 1).

According to this EGR control method, it is possible to obtain the same operations and effects as provided by the invention according to claim 3.

The invention according to claim 9 is the EGR control method according to any one of claims 6 to 8, wherein the learned value (LP-side learned value CorMAP_LP, HP-side learned value CorMAP_HP) is calculated such that an absolute value of the feedback correction value (LP-side learned value CorMAP_LP, HP-side learned value CorMAP_HP) is reduced.

According to this EGR control method, it is possible to obtain the same operations and effects as provided by the invention according to claim 4.

The invention according to claim 10 is the EGR control method according to any one of claims 6 to 9, wherein the learned value (LP-side learned value CorMAP_LP, HP-side learned value CorMAP_HP) is calculated using a model value that is calculated from a correlation model (FIGS. 9, 10) defining a relationship between at least one pair of a pair of correlation parameters (target LP opening θ_LP_dmd, target HP opening θ_HP_dmd) having correlations with the high-pressure EGR amount and the low-pressure EGR amount, respectively, and a pair of flow rate parameters (LP-side flow rate parameter Sf_LP, HP-side flow rate parameter Sf_HP) having correlations with the high-pressure EGR amount and the low-pressure EGR amount, respectively, and the model value (LP opening weight function Wp_LP_i, LP-side flow rate weight function Wf_LP_i, HP opening weight function Wp_HP_i, HP-side flow rate weight function Wf_HP_i).

According to this EGR control method, it is possible to obtain the same operations and effects as provided by the invention according to claim 5.

DESCRIPTION OF EMBODIMENTS

Figure 1:
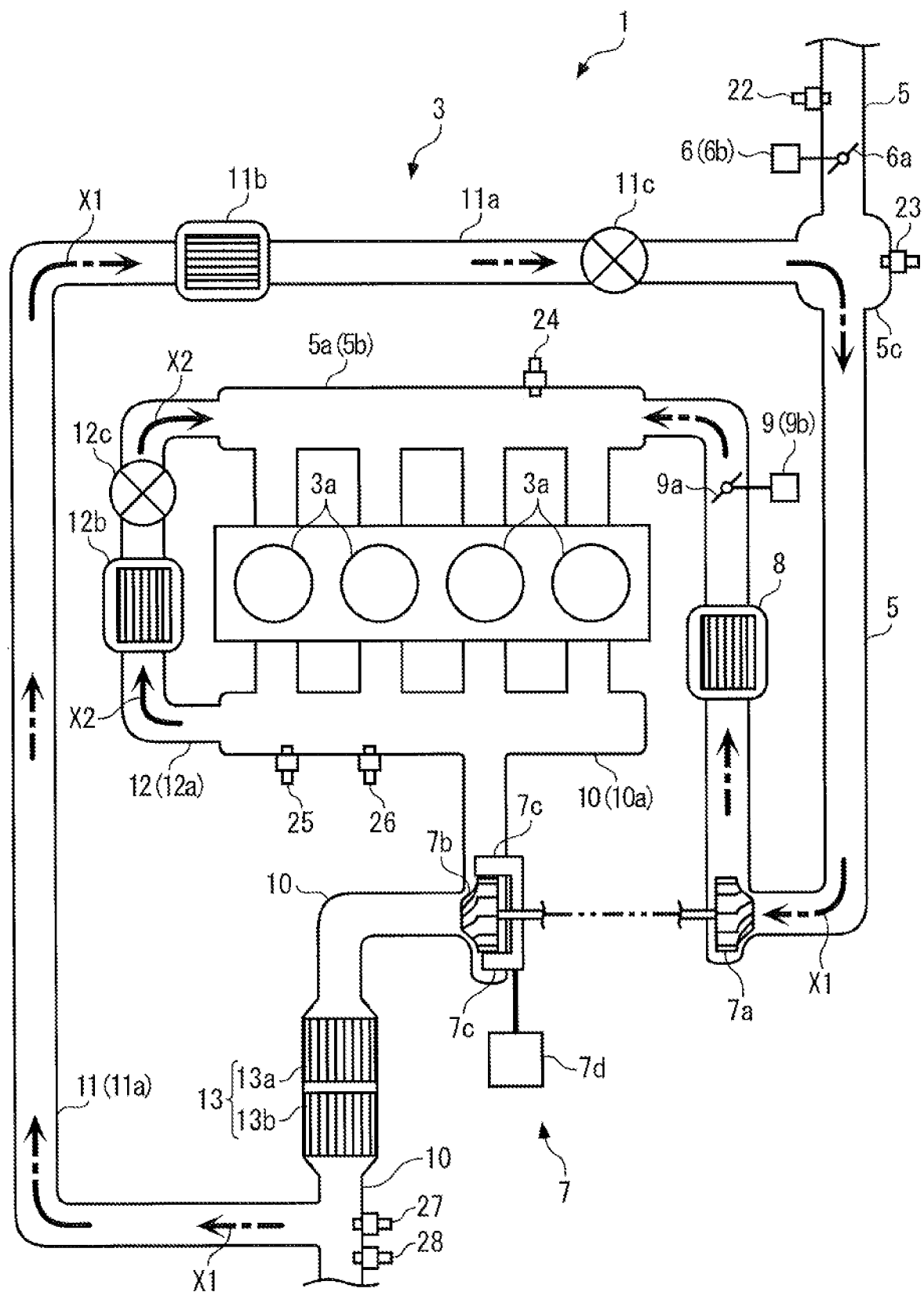
FIG. 1 A diagram schematically showing the configuration of a EGR control apparatus according to a first embodiment of the present invention and an internal combustion engine to which the EGR control apparatus is applied.

An EGR control apparatus for an internal combustion engine, according an embodiment of the invention, will now be described in detail with reference to drawings. As shown in FIG. 2, the EGR control apparatus 1 according to the present embodiment includes an ECU 2, which performs EGR control of an internal combustion engine (hereinafter simply referred to as the "engine") 3 shown in FIG. 1, by a control method described hereinafter. Note that in the present embodiment, the ECU 2 corresponds to error parameter calculation means, correction value calculation means, target opening degree calculation means, and EGR control means.

The engine 3 is a diesel engine type, and is installed on a vehicle (not shown), as a motive power source. The engine 3 includes four cylinders 3a, fuel injection valves 4 (only one of which is shown in FIG. 2) provided for the cylinders, respectively, and so forth. The fuel injection valves 4 are electrically connected to the ECU 2, and the valve-opening timing and valve-closing timing of each fuel injection valve 4 are controlled by a control input signal from the ECU 2. With this, a fuel injection amount and fuel injection timing of the fuel injection valve 4 are controlled.

The engine 3 is provided with a crank angle sensor 20 and an engine coolant temperature sensor 21. The crank angle sensor 20 is formed by a magnet rotor and an MRE pickup, and delivers a CRK signal, which is a pulse signal, to the ECU 2 along with rotation of a crankshaft (not shown). Each pulse of the CRK signal is delivered whenever the crankshaft rotates through a predetermined crank angle (e.g. 2°). The ECU 2 calculates an engine speed NE, which is a rotational speed of the engine 3, based on the CRK signal.

Further, the engine coolant temperature sensor 21 is implemented e.g. by a thermistor, and delivers a detection signal indicative of an engine coolant temperature TW, which is the temperature of engine coolant circulating through a cylinder block of the engine 3, to the ECU 2.

On the other hand, an air flow sensor 22, a throttle valve mechanism 6, an intake air pressure sensor 23, a turbocharger 7, an intercooler 8, an intake shutter mechanism 9, and an intake chamber pressure sensor 24 are provided in an intake passage 5 of the engine 3, from upstream in the mentioned order.

The throttle valve mechanism 6 includes a throttle valve 6a and a TH actuator 6b for actuating the throttle valve 6a. The throttle valve 6a is pivotally provided in an intermediate portion of the intake passage 5 and changes the amount of air passing therethrough by a change in an opening caused by the pivotal motion thereof. The TH actuator 6b is formed by combining a motor and a reduction gear mechanism (neither of which is shown), and is electrically connected to the ECU 2. The ECU 2 controls a throttle valve opening TH, which is the degree of opening of the throttle valve 6*a*, via the TH actuator 6*b*.

Further, the air flow sensor 22 is formed by a hot-wire air flow meter, and detects the amount of fresh air passing through the throttle valve 6*a*, to deliver a detection signal indicative of the detected fresh air amount to the ECU 2. The ECU 2 calculates an in-cylinder fresh air amount Gair_cyl_act, which is the amount of fresh air drawn into each cylinder 3*a*, based on the detection signal from the air flow sensor 22. The in-cylinder fresh air amount Gair_cyl_act is calculated as a mass flow rate.

Furthermore, the intake air pressure sensor 23 is implemented e.g. by a semiconductor pressure sensor, and detects an intake pressure Pin, which is a pressure within the intake passage 5 at a location downstream of the throttle valve 6*a*, to deliver a detection signal indicative of the detected intake pressure Pin to the ECU 2. The intake pressure Pin is detected as an absolute pressure.

On the other hand, the turbocharger 7 is comprised of a compressor blade 7*a* disposed in the intake passage 5 at a location downstream of the throttle valve 6*a*, a turbine blade 7*b* disposed in an intermediate portion of an exhaust passage 10 for being rotated in unison with the compressor blade 7*a*, a plurality of variable vanes 7*c* (only two of which are shown), a vane actuator 7*d* for actuating the variable vanes 7*c*, and so forth.

In the turbocharger 7, when the turbine blade 7*b* is driven for rotation by exhaust gases flowing though the exhaust passage 10, the compressor blade 7*a* integrally formed therewith simultaneously rotates, whereby air in the intake passage 5 is pressurized, that is, a supercharging operation is performed.

Further, the variable vanes 7*c* are for changing boost pressure generated by the turbocharger 7, and are pivotally mounted on a wall of a portion of a housing, where the turbine blade 7*b* is accommodated. The variable vanes 7*c* are mechanically connected to the vane actuator 7*d* connected to the ECU 2. The ECU 2 changes the degree of opening of the variable vanes 7*c* via the vane actuator 7*d* to change the amount of exhaust gases blown to the turbine blade 7*b*, whereby the rotational speed of the turbine blade 7*b*, that is, the rotational speed of the compressor blade 7*a*, is changed to thereby control the boost pressure.

Further, the intercooler 8 is a water cooling type. When intake air passes through the intercooler 8, the intercooler 8 cools the intake air the temperature of which has been raised by the supercharging operation of the turbocharger 7.

Furthermore, the intake shutter mechanism 9 is configured similar to the above-described throttle valve mechanism 6, and includes an intake shutter 9*a*, an IS actuator 9*b* for actuating the intake shutter 9*a*, and so forth. In the intake shutter mechanism 9, the IS actuator 9*b* is driven by a control input signal from the ECU 2, whereby the degree of opening of the intake shutter 9*a* is controlled.

In the control of the degree of opening of the intake shutter 9*a*, the intake shutter 9*a* is normally held in a fully-open state, and only when predetermined operating conditions are satisfied, the degree of opening of the intake shutter 9*a* is controlled to a slightly more closed state than the fully-open state.

On the other hand, the intake chamber pressure sensor 24 is implemented e.g. by a semiconductor pressure sensor, and detects an intake chamber pressure Pch, which is a pressure within an intake chamber 5*b* of an intake manifold 5*a*, to deliver a detection signal indicative of the detected intake chamber pressure Pch to the ECU 2. The intake chamber pressure Pch is detected as an absolute pressure.

On the other hand, an exhaust manifold pressure sensor 25, an exhaust manifold temperature sensor 26, the above-described turbine blade 7*b*, a catalytic device 13, an exhaust pressure sensor 27, and an exhaust temperature sensor 28 are provided at respective locations of the exhaust passage 10 of the engine 3 from upstream in the mentioned order.

The exhaust manifold pressure sensor 25 is implemented e.g. by a semiconductor pressure sensor, and detects an exhaust manifold pressure Pem, which is a pressure within an exhaust manifold 10*a*, to deliver a detection signal indicative of the detected exhaust manifold pressure Pem to the ECU 2. The exhaust manifold pressure Pem is detected as an absolute pressure.

The exhaust manifold temperature sensor 26 detects an exhaust manifold temperature Tem, which is the temperature of exhaust gases in the exhaust manifold 10*a*, and delivers a detection signal indicative of the detected exhaust manifold temperature Tem to the ECU 2. The exhaust manifold temperature Tem is detected as an absolute temperature.

On the other hand, the catalytic device 13 is for purifying exhaust gases flowing through the exhaust passage 10, and is formed by combining a DOC (Diesel Oxidation Catalyst) 13*a* and a CSF (Catalyzed Soot Filter) 13*b*.

Further, the exhaust pressure sensor 27 is provided at a location downstream of the catalytic device 13, and detects an exhaust pressure Pex, which is the pressure of exhaust gases having passed through the catalytic device 13, to deliver a detection signal indicative of the detected exhaust pressure Pex to the ECU 2. In the case of the present embodiment, the exhaust pressure Pex is detected as an absolute pressure.

Furthermore, similar to the exhaust pressure sensor 27, the exhaust temperature sensor 28 as well is provided at a location downstream of the catalytic device 13, and detects an exhaust temperature Tex, which is the temperature of exhaust gases having passed through the catalytic device 13, to deliver a detection signal indicative of the detected exhaust temperature Tex to the ECU 2. The exhaust temperature Tex is detected as an absolute temperature.

In addition to this, the engine 3 is provided with a LP-EGR device 11 and a HP-EGR device 12. The LP-EGR device 11 (low-pressure EGR device) is for recirculating part of exhaust gases in the exhaust passage 10 into the intake passage 5, and is comprised of a LP-EGR passage 11*a* connected between the intake passage 5 and the exhaust passage 10, a LP-EGR cooler 11*b* for cooling recirculated gases flowing through the LP-EGR passage 11*a* (hereinafter referred to as "LP-EGR gases"), a LP-EGR valve 11*c* for opening and closing the LP-EGR passage 11*a*, and so forth. One end of the LP-EGR passage 11*a* opens into a portion of the exhaust passage 10 at a location downstream of the catalytic device 13, and the other end thereof opens into a connecting portion 5*c* of the intake passage 5 between the throttle valve 6*a* and the compressor blade 7*a*.

The LP-EGR valve 11*c* (low-pressure EGR device) is formed by a linear solenoid valve the degree of opening of which is linearly varied between a maximum value and a minimum value thereof, and is electrically connected to the ECU 2. The ECU 2 changes the degree of opening of the LP-EGR valve 11*c* to thereby control the amount of recirculated LP-EGR gases, i.e. a LP-EGR amount.

Figure 2:
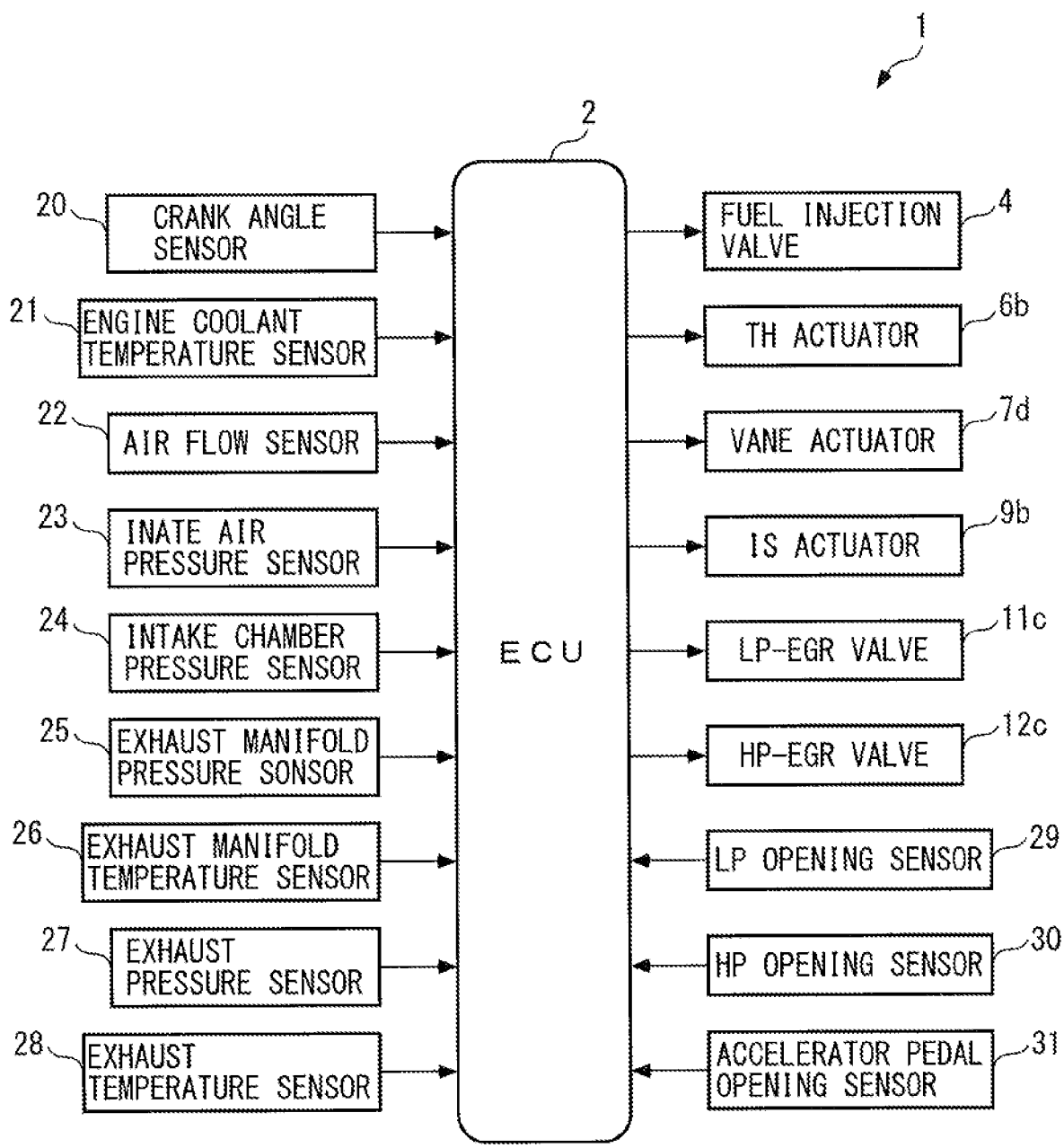
FIG. 2 A block diagram showing the electrical configuration of the EGR control apparatus.

With the arrangement described above, in the LP-EGR device 11, LP-EGR gases flow into the LP-EGR passage 11*a* from the portion of the exhaust passage 10 at the location downstream of the catalytic device 13, flow in a direction indicated by an arrow X1 in FIG. 1, pass through the LP-EGR cooler 11b and the LP-EGR valve 11c, and then flow into the connecting portion 5c of the intake passage 5. Subsequently, after passing through the compressor blade 7a and the intercooler 8 together with fresh air, the LP-EGR gases flow into the cylinders 3a via the intake manifold 5a.

On the other hand, similar to the LP-EGR device 11, the HP-EGR device 12 (high-pressure EGR device) as well is for recirculating part of exhaust gases in the exhaust passage 10 into the intake passage 5, and is comprised of a HP-EGR passage 12a connected between the intake passage 5 and the exhaust passage 10, a HP-EGR cooler 12b for cooling recirculated gases flowing through the HP-EGR passage 12a (hereinafter referred to as "HP-EGR gases"), a HP-EGR valve 12c for opening and closing the HP-EGR passage 12a, and so forth. One end of the HP-EGR passage 12a opens into the exhaust manifold 10a of the exhaust passage 10, and the other end thereof opens into the intake manifold 5a of the intake passage 5.

The HP-EGR valve 12c (high-pressure EGR device) is formed by a linear solenoid valve the degree of opening of which is linearly varied between a maximum value and a minimum value thereof, and is electrically connected to the ECU 2. The ECU 2 changes the degree of opening of the HP-EGR valve 12c to thereby control the amount of recirculated HP-EGR gases, that is, a HP-EGR amount.

With the arrangement described above, in the HP-EGR device 12, HP-EGR gases flow into the HP-EGR passage 12a from the exhaust manifold 10a, flow in a direction indicated by an arrow X2 in FIG. 1, pass through the HP-EGR cooler 12b and the HP-EGR valve 12c, and then flow into the intake manifold 5a. Subsequently, the HP-EGR gases flow into the cylinders 3a via the intake manifold 5a together with fresh air.

In this case, the path through which the LP-EGR gases reach the cylinders 3a is longer than the path through which the HP-EGR gases reach the cylinders 3a, and hence the LP-EGR gases take a longer time to flow into the cylinders 3a than the HP-EGR gases. As a result, the LP-EGR gases are recirculated into the cylinders 3a at a lower pressure and a lower temperature than the HP-EGR gases.

On the other hand, as shown in FIG. 2, a LP opening sensor 29, a HP opening sensor 30, and an accelerator pedal opening sensor 31 are connected to the ECU 2. The LP opening sensor 29 detects a LP opening $\theta\_LP$, which is the degree of opening of the LP-EGR valve 11c, and delivers a detection signal indicative of the detected LP opening $\theta\_LP$ to the ECU 2. The HP opening sensor 30 detects a HP opening $\theta\_HP$, which is the degree of opening of the HP-EGR valve 12c, and delivers a detection signal indicative of the detected HP opening $\theta\_HP$ to the ECU 2. Note that in the present embodiment, the LP opening $\theta\_LP$ corresponds to the degree of opening of a low-pressure EGR valve, and the HP opening $\theta\_HP$ corresponds to the degree of opening of a high-pressure EGR valve.

Further, the accelerator pedal opening sensor 31 detects an accelerator pedal opening AP, which is a stepped-on amount of an accelerator pedal, not shown, of the vehicle, and delivers a detection signal indicative of the detected accelerator pedal opening AP to the ECU 2.

Further, the ECU 2 is implemented by a microcomputer comprised of a CPU, a RAM, a ROM, and an I/O interface (none of which are shown). The ECU 2 determines an operating state of the engine 3 according to the detection signals from the aforementioned sensors 20 to 31, and so forth, and performs the EGR control according to the operating state, by a method described hereinafter.

Figure 3:
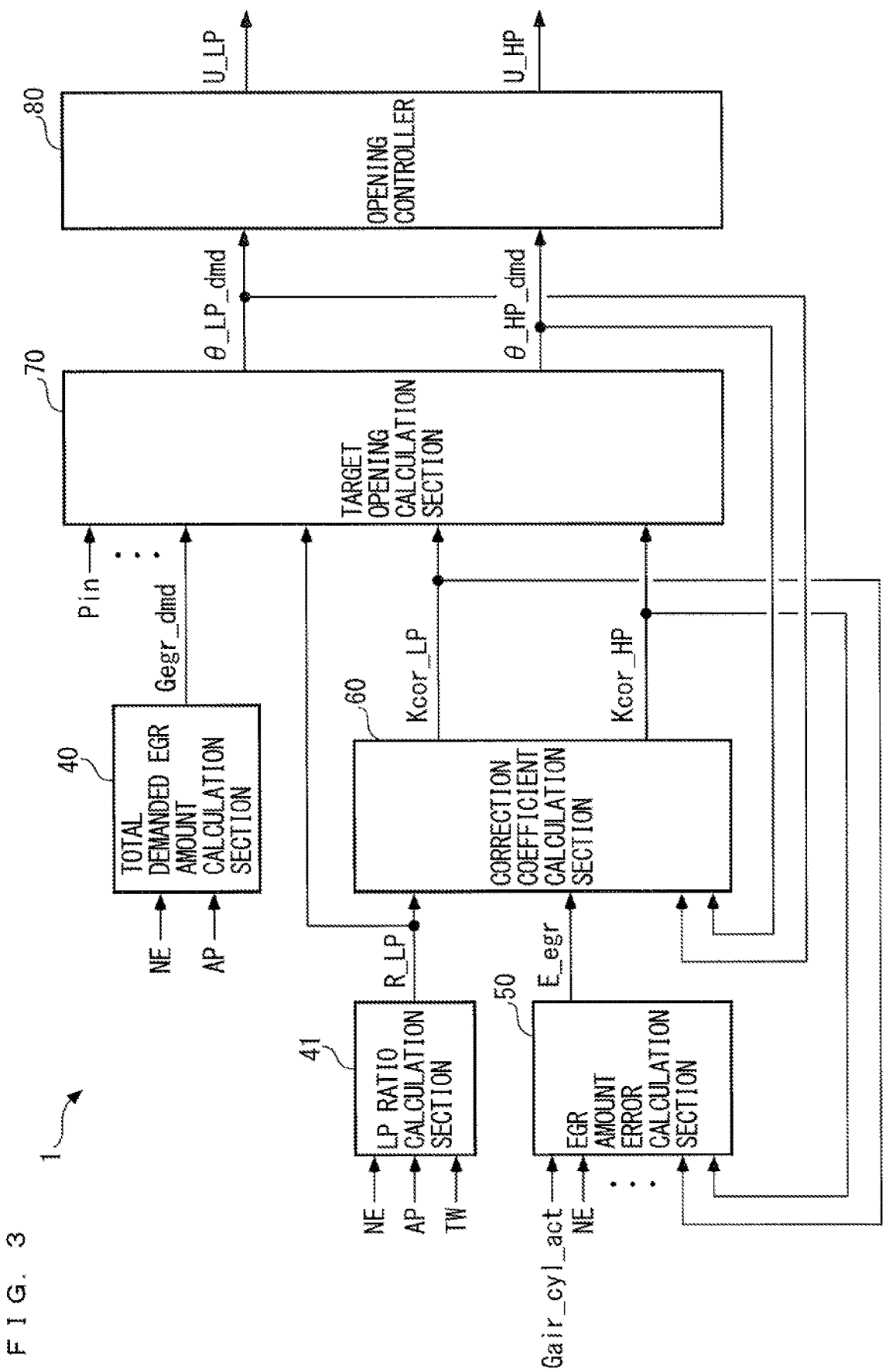
FIG. 3 A block diagram showing the functional configuration of the EGR control apparatus.

Next, a description will be given of a functional configuration of the EGR control apparatus 1 according to the present embodiment. The EGR control apparatus 1 is for performing the EGR control by the method described hereinafter, and as shown in FIG. 3, includes a total demanded EGR amount calculation section 40, a LP ratio calculation section 41, an EGR amount error calculation section 50, a correction coefficient calculation section 60, a target opening calculation section 70, and an opening controller 80. These elements 40 to 80 are all formed by the ECU 2.

Note that, in the following description, discrete data with a symbol (k) indicates that it is data calculated (or sampled) in synchronism with a predetermined period $\Delta T$, and the symbol k (k is a positive integer) indicates a position in the sequence of calculating cycles of respective discrete data. For example, the symbol k indicates that discrete data therewith is a value calculated at the current calculation time, and a symbol k−1 indicates that discrete data therewith is a value calculated at the immediately preceding calculation time. Further, in the following description, the symbol (k) indicating that discrete data therewith is the current value of the discrete data is omitted as deemed appropriate.

First, the total demanded EGR amount calculation section 40 calculates a total demanded EGR amount Gegr_dmd by a method described as follows: An engine demanded torque TRQ_eng is calculated by searching a map, not shown, according to the engine speed NE and the accelerator pedal opening AP, and the total demanded EGR amount Gegr_dmd is calculated by searching a map, not shown, according to the engine demanded torque TRQ_eng and the engine speed NE. The total demanded EGR amount Gegr_dmd corresponds to a total EGR amount demanded of the engine 3 (i.e. the sum of the LP-EGR amount and the HP-EGR amount).

Further, the LP ratio calculation section 41 calculates a LP ratio R_LP by the following equation (1). The LP ratio R_LP corresponds to a ratio of the LP-EGR amount to the total EGR amount.

[Math 1]

$$R\_LP(k) = Kr\_LP\_tw(k) \cdot R\_LP\_bs(k) \quad (1)$$

Figure 4:
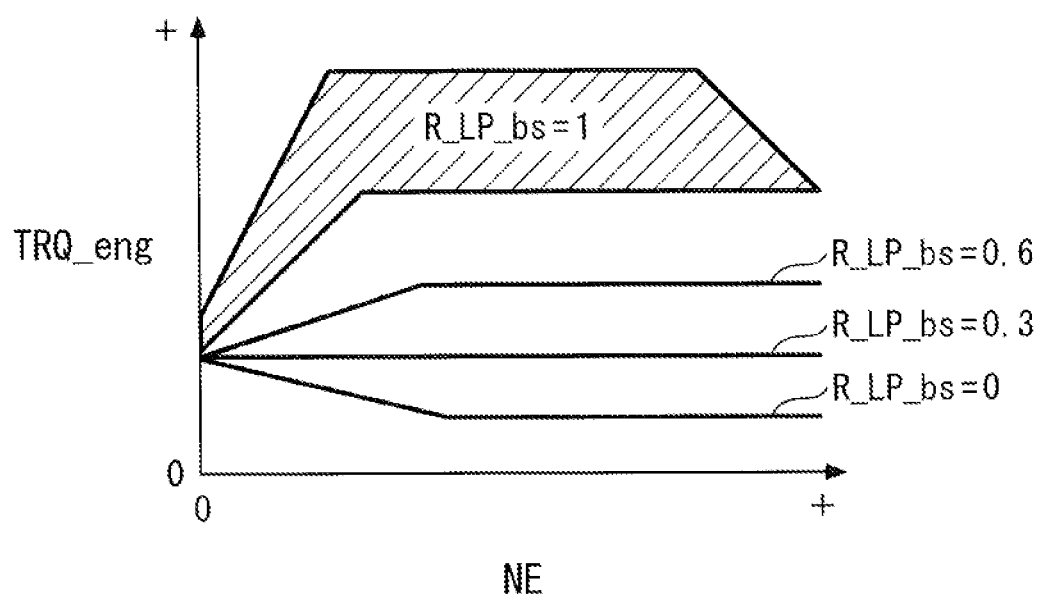
FIG. 4 A diagram showing an example of a map for use in calculating a LP ratio reference value.

As shown in the above equation (1), the LP ratio R_LP is calculated as the product of a LP ratio reference value R_LP_bs and a coolant temperature-dependent correction coefficient Kr_LP_tw. The LP ratio reference value R_LP_bs is calculated by searching a map shown in FIG. 4 according to the engine speed NE and the engine demanded torque TRQ_eng. In the figure, an area indicated by hatching is an area where the LP ratio reference value R_LP_bs=1 (i.e. the total EGR amount=the LP-EGR amount) holds. As is apparent from the figure, when the engine 3 is in a medium-to-high engine speed region and a high-load region, the LP ratio reference value R_LP_bs is set to 1 so as to recirculate only the LP-EGR gases. On the other hand, in the medium-to-high engine speed region, as load on the engine 3 becomes lower, the LP ratio reference value R_LP_bs is set to a smaller value so as to increase the recirculation ratio of the HP-EGR gases.

Figure 5:
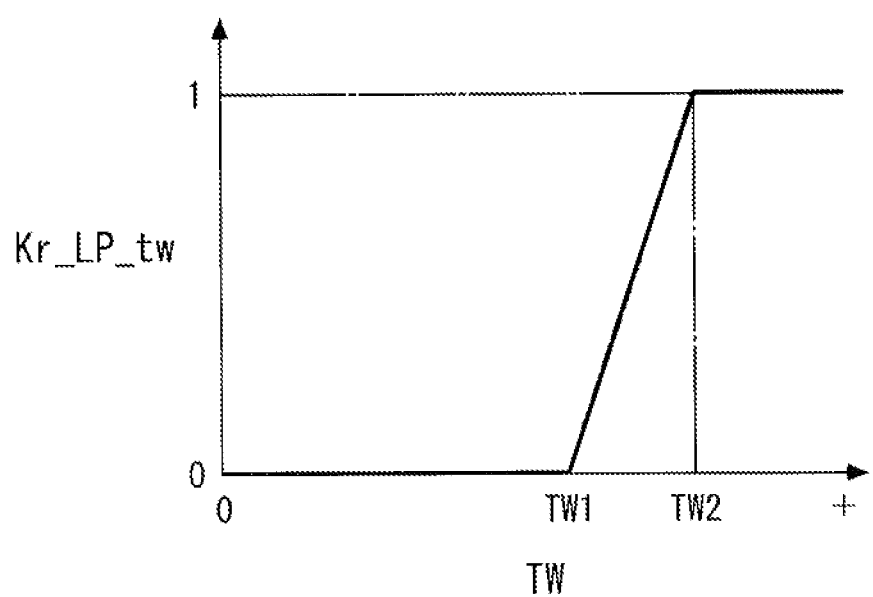
FIG. 5 A diagram showing an example of a map for use in calculating a coolant temperature-dependent correction coefficient.

Further, the coolant temperature-dependent correction coefficient Kr_LP_tw is calculated by searching a map shown in FIG. 5 according to the engine coolant temperature TW. In the figure, TW1 and TW2 indicate predetermined values of the engine coolant temperature TW, which are set such that TW1<TW2 holds. As shown in the figure, in a region where TW<TW1 holds, the engine is being warmed up, and hence Kr_LP_tw is set to 0 so as to recirculate only the HP-EGR gases, while in a region where TW1≤TW≤TW2 holds, as the warming-up of the engine proceeds thereby increasing the engine coolant temperature TW, the coolant temperature-dependent correction coefficient Kr_LP_tw is set to a larger value so as to increase the ratio of the LP-EGR gases. Further, in a region where TW2<TW holds, the warming-up of the engine 3 has been completed, and hence Kr_LP_tw is set to 1 so as to recirculate only the LP-EGR gases.

Next, a description will be given of the EGR amount error calculation section 50 (error parameter calculation means). The EGR amount error calculation section 50 is for calculating an EGR amount error E_egr (error parameter) by a method described as follows: The EGR amount error E_egr corresponds to an error of the EGR amount attributable to the aging of the LP-EGR device 11 and the HP-EGR device 12, variation in individual products of the devices 11 and 12, sludge, and so forth.

Figure 6:
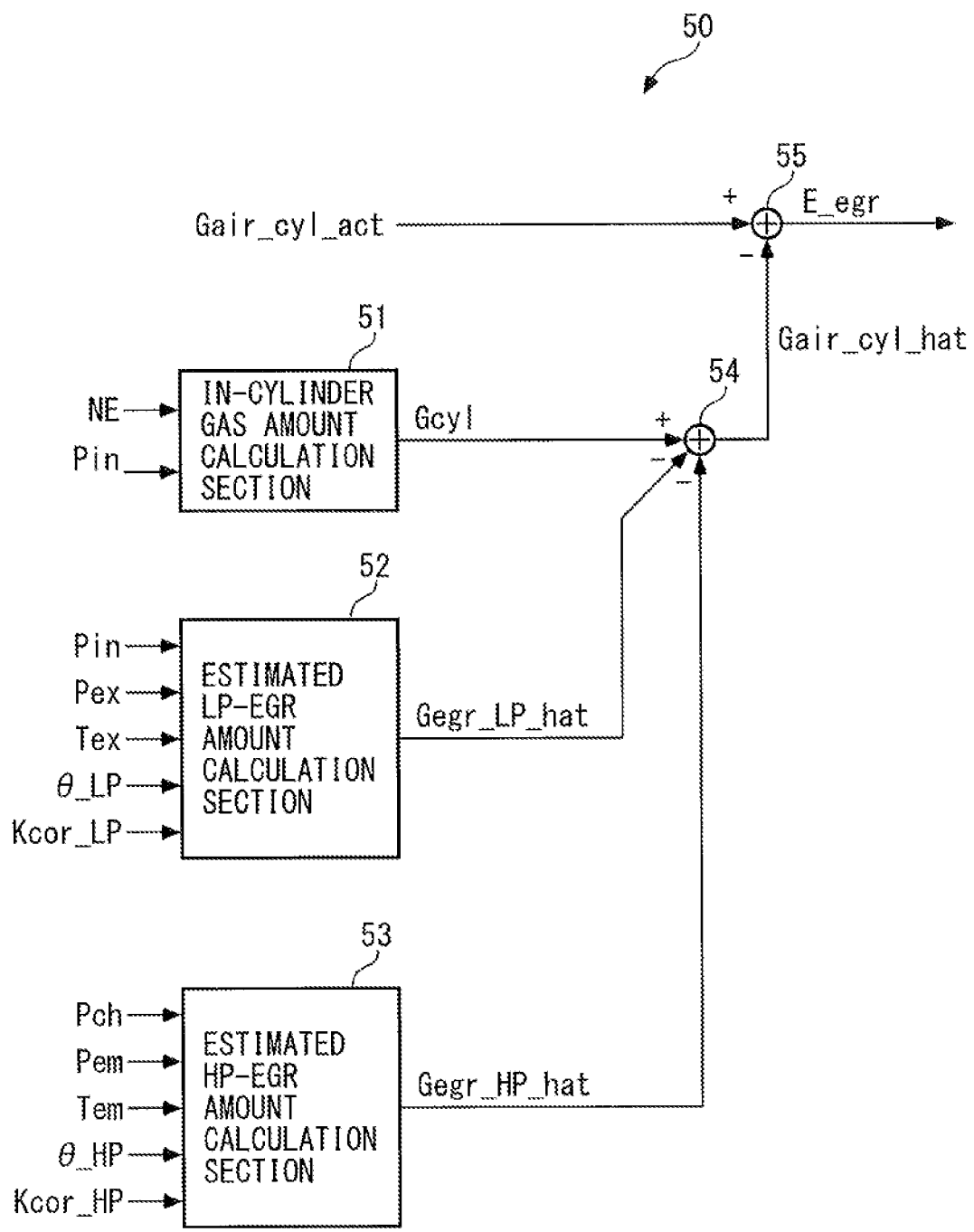
FIG. 6 A block diagram showing the functional configuration of an EGR amount error calculation section.

As shown in FIG. 6, the EGR amount error calculation section 50 is comprised of an in-cylinder gas amount calculation section 51, an estimated LP-EGR amount calculation section 52, an estimated HP-EGR amount calculation section 53, and two subtractors 54 and 55.

The in-cylinder gas amount calculation section 51 is for calculating an in-cylinder gas amount Gcyl which is a total amount of gases estimated to have been drawn into a cylinder 3a. The in-cylinder gas amount Gcyl is calculated by searching a map, not shown, according to the engine speed NE and the intake pressure Pin.

Further, the estimated LP-EGR amount calculation section 52 calculates an estimated LP-EGR amount Gegr_LP_hat by the following equation (2). The estimated LP-EGR amount Gegr_LP_hat is an estimated value of the EGR amount of gases recirculated into the cylinder 3a via the LP-EGR device 11. This equation (2) is derived using a nozzle equation by regarding the LP-EGR valve 11c as a nozzle.

[Math 2]

$$Gegr\_LP\_hat(k) = \frac{A\_LP(k)}{Kcor\_LP(k-1)} \cdot \frac{Pin(k)}{\sqrt{R \cdot Tex(k)}} \cdot \sqrt{\frac{2\kappa}{\kappa-1} \cdot \left(Rp\_LP(k)^{\frac{2}{\kappa}} - Rp\_LP(k)^{\frac{\kappa+1}{\kappa}}\right)} \quad (2)$$

Figure 7:
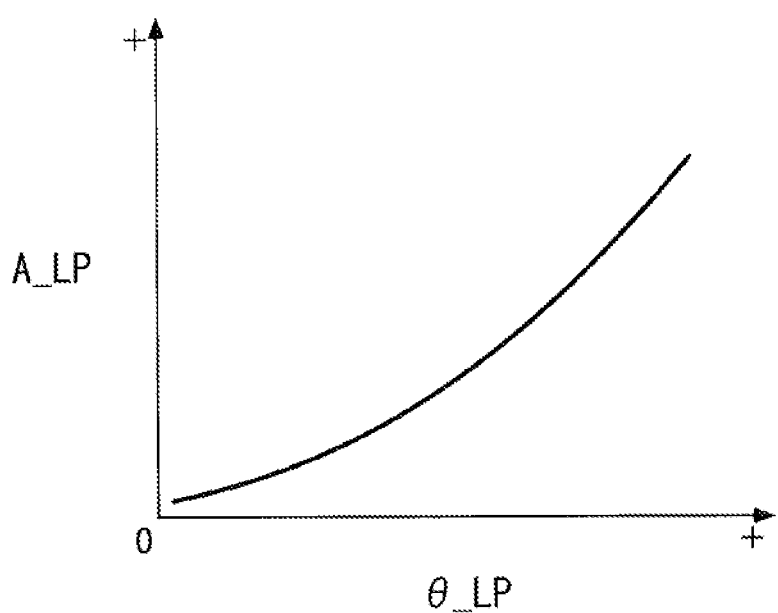
FIG. 7 A diagram showing an example of a map for use in calculating a LP effective opening area.

In the above equation (2), A_LP represents a LP effective opening area. The LP effective opening area A_LP is calculated by searching a map shown in FIG. 7 according to the LP opening θ_LP. Further, k represents a specific heat ratio, and R represents a gas constant. Furthermore, Kcor_LP represents a LP-side correction coefficient, and is calculated by the correction coefficient calculation section 60 by a method described hereinafter.

Further, Rp_LP represents a pressure ratio between pressures on the downstream and upstream sides of the LP-EGR valve 11c, and is calculated by the following equation (3):

[Math 3]

$$Rp\_LP(k) = \frac{Pin(k)}{Pex(k)} \quad (3)$$

On the other hand, the estimated HP-EGR amount calculation section 53 calculates an estimated HP-EGR amount Gegr_HP_hat by the following equation (4). The estimated HP-EGR amount Gegr_HP_hat is an estimated value of the EGR amount of gases recirculated into the cylinder 3a via the HP-EGR device 12. This equation (4) is derived using a nozzle equation by regarding the HP-EGR valve 12c as a nozzle.

[Math 4]

$$Gegr\_HP\_hat(k) = \frac{A\_HP(k)}{Kcor\_HP(k-1)} \cdot \frac{Pch(k)}{\sqrt{R \cdot Tem(k)}} \cdot \sqrt{\frac{2\kappa}{\kappa-1} \cdot \left(Rp\_HP(k)^{\frac{2}{\kappa}} - Rp\_HP(k)^{\frac{\kappa+1}{\kappa}}\right)} \quad (4)$$

In the equation (4), A_HP represents a HP effective opening area. The HP effective opening area A_HP is calculated by searching a map which defines a relationship between the HP effective opening area A_HP and the HP opening θ_HP. In this case, as the map, there is used a map which is obtained by replacing the LP effective opening area A_LP on a vertical axis in FIG. 7 with the HP effective opening area A_HP, and the LP opening θ_LP on a horizontal axis in FIG. 7 with the HP opening θ_HP, and in which the relationship between the two is set to have the same tendency as in FIG. 7. Further, Kcor_HP represents the HP-side correction coefficient, and is calculated by the correction coefficient calculation section 60 by the method described hereinafter.

Furthermore, in the above equation (4), Rp_HP represents a pressure ratio between pressures on the downstream and upstream sides of the HP-EGR valve 12c, and is calculated by the following equation (5):

[Math 5]

$$Rp\_HP(k) = \frac{Pch(k)}{Pem(k)} \quad (5)$$

On the other hand, the subtractor 54 calculates an estimated in-cylinder fresh air amount Gair_cyl_hat by the following equation (6). The estimated in-cylinder fresh air amount Gair_cyl_hat is an estimated value of the amount of fresh air drawn into the cylinder 3a.

[Math 6]

$$Gair\_cyl\_hat(k) = Gcyl(k) - Gegr\_LP\_hat(k) - Gegr\_HP\_hat(k) \quad (6)$$

The subtractor 55 calculates the EGR amount error E_egr which corresponds to an error between a true value and an estimated value of the total EGR amount, by the following equation (7). That is, the EGR amount error E_egr is calculated as a difference between the in-cylinder fresh air amount Gair_cyl_act and the estimated in-cylinder fresh air amount Gair_cyl_hat.

[Math 7]

$$E\_egr(k) = Gair\_cyl\_act(k) - Gair\_cyl\_hat(k) \quad (7)$$

Next, a description will be given of the aforementioned correction coefficient calculation section 60 (correction value calculation means). The correction coefficient calculation section 60 is for calculating the LP-side correction coefficient Kcor_LP (low pressure-side correction value) and the HP-side correction coefficient Kcor_HP (high pressure-side correction value) by the method described hereinafter. These correction coefficients Kcor_LP and Kcor_HP are for correcting the above-described EGR amount error E_egr.

Figure 8:
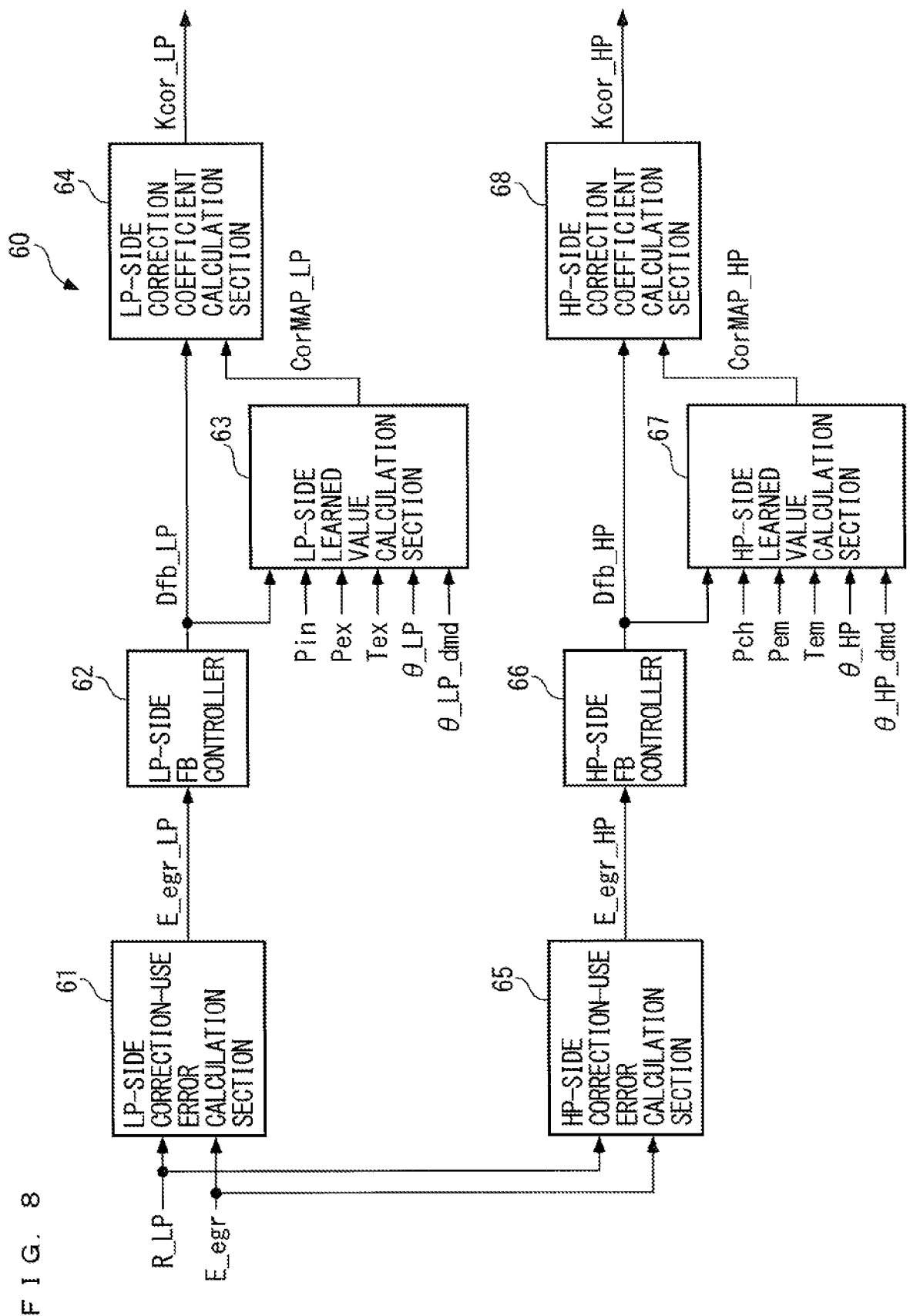
FIG. 8 A block diagram showing the functional configuration of a correction coefficient calculation section.

As shown in FIG. 8, the correction coefficient calculation section 60 includes a LP-side correction-use error calculation section 61, a LP-side FB controller 62, a LP-side learned value calculation section 63, a LP-side correction coefficient calculation section 64, a HP-side correction-use error calculation section 65, a HP-side FB controller 66, a HP-side learned value calculation section 67, and a HP-side correction coefficient calculation section 68.

The LP-side correction-use error calculation section 61 calculates a LP-side correction-use error E_egr_LP by the following equation (8):

[Math 8]

$$E\_egr\_LP(k) = R\_LP(k) \cdot E\_egr(k) \qquad (8)$$

As shown in this equation (8), the LP-side correction-use error E_egr_LP is calculated by multiplying the EGR amount error E_egr by the LP ratio R_LP, and hence is calculated as a value obtained by distributing the EGR amount error E_egr according to a ratio of the LP-EGR amount to the total EGR amount.

Further, the LP-side FB controller 62 calculates a LP-side FB correction value Dfb_LP (feedback correction value) with a PI control algorithm expressed by the following equation (9):

[Math 9]

$$Dfb\_LP(k) = Kp\_LP \cdot E\_egr\_LP(k) + \sum_{i=0}^{k} Ki\_LP \cdot E\_egr\_LP(i) \qquad (9)$$

In this equation (9), Kp_LP represents a predetermined P-term gain, and Ki_LP represents a predetermined I-term gain. The LP-side FB correction value Dfb_LP is calculated by the above equation (9) such that the LP-side correction-use error E_egr_LP is converged to a value of 0.

Further, the above-mentioned LP-side learned value calculation section 63 calculates a LP-side learned value CorMAP_LP (learned value) by a method described hereinafter.

First, a LP-side flow rate parameter Sf_LP (flow rate parameter) is calculated by the following equation (10):

[Math 10]

$$Sf\_LP(k) = \frac{Pin(k)}{\sqrt{R \cdot Tex(k)}} \cdot \sqrt{\frac{2\kappa}{\kappa - 1} \cdot \left(Rp\_LP(k)^{\frac{2}{\kappa}} - Rp\_LP(k)^{\frac{\kappa+1}{\kappa}}\right)} \qquad (10)$$

Then, a LP-side local correction learned value CorMAP_LP_local_ij is calculated by the following equation (11):

[Math 11]

$$CorMAP\_LP\_local\_ij(k) = CorMAP\_LP\_local\_ij(k-1) + \qquad (11)$$
$$Kln\_Lp \cdot \sum_{i=1}^{3} \sum_{j=1}^{3} Wp\_LP\_i(k-1) \cdot Wf\_LP\_j(k-1) \cdot Eln\_LP(k)$$

In this equation (11), Kln_LP is a predetermined learned value gain set such that 0<Kln_LP<1 holds. Further, Wp_LP_i (i=1 to 3) represents LP opening weight functions. The LP opening weight functions Wp_LP_i are calculated by searching a map shown in FIG. 9 according to an immediately preceding value θ_LP_dmd (k−1) of a target LP opening. As shown in the figure, the LP opening weight functions Wp_LP_i are set with respect to any value of the immediately preceding value θ_LP_dmd (k−1) of the target LP opening such that the total sum of the LP opening weight functions Wp_LP_i becomes equal to 1. On the other hand, the target LP opening θ_LP_dmd is calculated by the target opening calculation section 70, as described hereinafter.

Figure 9:
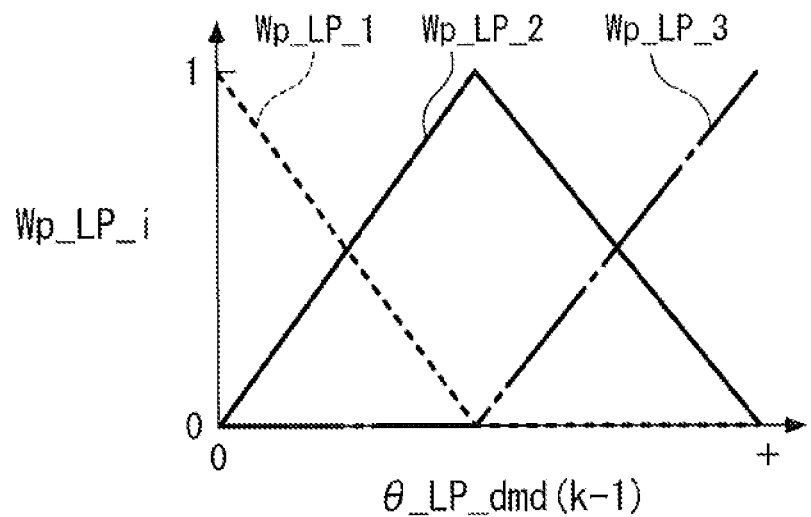
FIG. 9 A diagram showing an example of a map for use in calculating a LP opening weight function.
Figure 10:
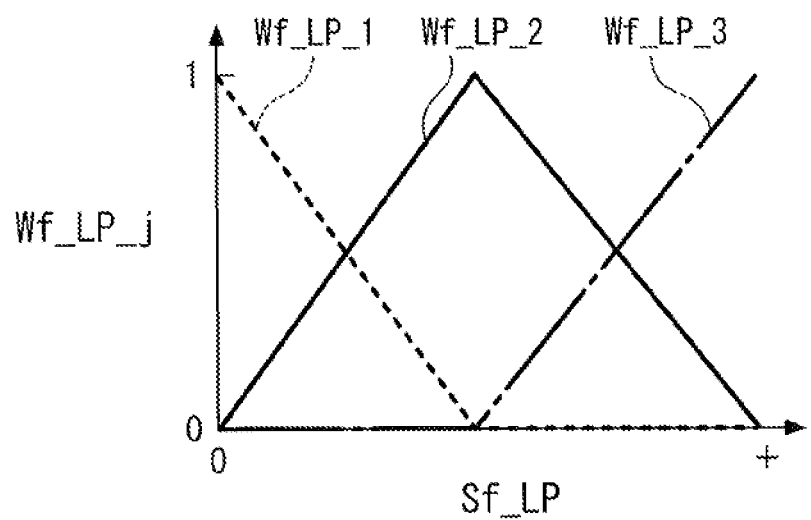
FIG. 10 A diagram showing an example of a map for use in calculating a LP-side flow rate weight function.

Furthermore, in the above equation (11), Wf_LP_j (j=1 to 3) represents LP-side flow rate weight functions, and the LP-side flow rate weight functions Wf_LP_j are calculated by searching a map shown in FIG. 10 according to the LP-side flow rate parameter Sf_LP. As shown in the figure, the LP-side flow rate weight functions Wf_LP_j are set with respect to any value of the LP-side flow rate parameter Sf_LP such that the total sum of the LP-side flow rate weight functions Wf_LP_j becomes equal to 1. Note that in the present embodiment, FIGS. 9 and 10 correspond to correlation models, and the LP opening weight functions Wp_LP_i and the LP-side flow rate weight functions Wf_LP_j correspond to model values.

Further, in the equation (11), Eln_LP represents a LP-side correction-use error signal, and is calculated by the following equations (12) and (13):

[Math 12]

$$\text{When } R\_LP(k-1)=1.0 \text{ holds, } Eln\_LP(k)=Dfb\_LP(k-1) \qquad (12)$$

[Math 13]

$$\text{When } R\_LP(k-1) \neq 1.0 \text{ holds, } Eln\_LP(k)=0 \qquad (13)$$

Then, the LP-side learned value CorMAP_LP is finally calculated by the following equation (14):

[Math 14]

$$CorMAP\_LP(k) = \qquad (14)$$
$$\sum_{i=1}^{3} \sum_{j=1}^{3} Wp\_LP\_i(k) \cdot Wf\_LP\_j(k) \cdot CorMAP\_LP\_local\_ij(k)$$

As described above, when the LP ratio R_LP=1.0 (second predetermined value), i.e. when recirculation of exhaust gases only by the LP-EGR device 11 is being performed, the LP-side local correction learned value CorMAP_LP_local_ij is calculated by the equations (11) and (12). In this case, since the predetermined learned value gain Kln_LP is set such that 0<Kln_LP<1 holds, the LP-side local correction learned value CorMAP_LP_local_ij is calculated such that as the calculation thereof proceeds (i.e. as learning proceeds), the LP-side correction-use error signal Eln_LP, i.e. the absolute value of the LP-side FB correction value Dfb_LP is reduced. As a result, the LP-side learned value CorMAP_LP as well is calculated such that the absolute value of the LP-side FB correction value Dfb_LP is reduced.

Further, when the LP ratio R_LP±1.0 holds, i.e. when recirculation of exhaust gases by both of the LP-EGR device 11 and the HP-EGR device 12 is being performed, or when recirculation of exhaust gases only by the HP-EGR device 12 is being performed, the LP-side local correction learned value CorMAP_LP_local_ij is calculated by the equations (11) and (13), and hence is held at an immediately preceding value thereof without being updated.

Furthermore, the aforementioned LP-side correction coefficient calculation section 64 calculates the LP-side correction coefficient Kcor_LP by the following equation (15):

[Math 15]

$$K\text{cor\_LP}(k) = 1 + D\text{fb\_LP}(k) + \text{CorMAP\_LP}(k) \tag{15}$$

On the other hand, the above-mentioned HP-side correction-use error calculation section 65 calculates a HP-side correction error E_egr_HP by the following equation (16):

[Math 16]

$$E\_egr\_HP(k) = [1 - R\_LP(k)] \cdot E\_egr(k) \tag{16}$$

As shown in the above equation (16), the HP-side correction error E_egr_HP is calculated by multiplying the EGR amount error E_egr by a value [1−R_LP] obtained by subtracting the LP ratio R_LP from a value of 1, and hence is calculated as a value obtained by distributing the EGR amount error E_egr according to a ratio of the HP-EGR amount to the total EGR amount.

Further, the HP-side FB controller 66 calculates a HP-side FB correction value Dfb_HP (feedback correction value) with a PI control algorithm expressed by the following equation (17):

[Math 17]

$$D\text{fb\_HP}(k) = K\text{p\_HP} \cdot E\_egr\_HP(k) + \sum_{i=0}^{k} K\text{i\_HP} \cdot E\_egr\_HP(i) \tag{17}$$

In this equation (17), Kp_HP represents a predetermined P-term gain, and Ki_HP represents a predetermined I-term gain. The HP-side FB correction value Dfb_HP is calculated by the above equation (17) such that the HP-side correction error E_egr_HP is converged to a value of 0.

Further, the above-mentioned HP-side learned value calculation section 67 calculates a HP-side learned value CorMAP_HP (learned value) by a method described hereinafter.

First, a HP-side flow rate parameter Sf_HP (flow rate parameter) is calculated by the following equation (18):

[Math 18]

$$S\text{f\_HP}(k) = \frac{Pch(k)}{\sqrt{R \cdot Tem(k)}} \cdot \sqrt{\frac{2\kappa}{\kappa - 1} \cdot \left(R\text{p\_HP}(k)^{\frac{2}{\kappa}} - R\text{p\_HP}(k)^{\frac{\kappa+1}{\kappa}}\right)} \tag{18}$$

Then, a HP-side local correction learned value CorMAP_HP_local_ij is calculated by the following equation (19):

[Math 19]

$$\text{CorMAP\_HP\_local\_ij}(k) = \text{CorMAP\_HP\_local\_ij}(k-1) + \\ K\text{ln\_Hp} \cdot \sum_{i=1}^{3} \sum_{j=1}^{3} W\text{p\_HP\_i}(k-1) \cdot W\text{f\_HP\_j}(k-1) \cdot E\text{ln\_HP}(k) \tag{19}$$

In this equation (19), Kln_HP is a predetermined learned value gain set such that 0<Kln_HP<1 holds. Further, Wp_HP_i (i=1 to 3) represents HP opening weight functions. The HP opening weight functions Wp_HP_i are calculated by searching a map which defines a relationship between them and an immediately preceding value θ_HP_dmd (k−1) of a target HP opening. In this case, as the map, there is used a map which is obtained by replacing the LP opening weight functions Wp_LP_i on a vertical axis in FIG. 9 with the HP opening weight functions Wp_HP_i, and the immediately preceding value θ_LP_dmd (k−1) of the target LP opening on a horizontal axis in FIG. 9 with the immediately preceding value θ_HP_dmd (k−1) of the target HP opening. Further, the target HP opening θ_HP_dmd is calculated by the target opening calculation section 70, as described hereinafter.

Furthermore, in the above equation (19), Wf_HP_j (i=1 to 3) represents HP-side flow rate weight functions, and the HP-side flow rate weight functions Wf_HP_j are calculated by searching a map which defines a relationship between them and the HP-side flow rate parameter Sf_HP. In this case, as the map, there is used a map which is obtained by replacing the LP-side flow rate weight functions Wf_LP_j on a vertical axis in FIG. 10 with the HP-side flow rate weight functions Wf_HP_j, and the LP-side flow rate parameter Sf_LP on a horizontal axis in FIG. 10 with the HP-side flow rate parameter Sf_HP. Note that in the present embodiment, the HP opening weight functions Wp_HP_i and the HP-side flow rate weight functions Wf_HP_j correspond to model values.

Further, in the equation (19), Eln_HP represents a HP-side correction error signal, and is calculated by the following equations (20) and (21):

[Math 20]

$$\text{When } R\_LP(k-1) = 0 \text{ holds, } E\text{ln\_HP}(k) = D\text{fb\_HP}(k-1) \tag{20}$$

[Math 21]

$$\text{When } R\_LP(k-1) \cdot 0 \text{ holds, } E\text{ln\_HP}(k) = 0 \tag{21}$$

Then, the HP-side learned value CorMAP_HP is finally calculated by the following equation (22):

[Math 22]

$$\text{CorMAP\_HP}(k) = \\ \sum_{i=1}^{3} \sum_{j=1}^{3} W\text{p\_HP\_i}(k) \cdot W\text{f\_HP\_j}(k) \cdot \text{CorMAP\_HP\_local\_ij}(k) \tag{22}$$

As described above, when the LP ratio R_LP=0, i.e. when 1−R_LP=1 (first predetermined value) holds, and recirculation of exhaust gases only by the HP-EGR device 12 is being performed, the HP-side local correction learned value CorMAP_HP_local_ij is calculated by the equations (19) and (20). In this case, since the predetermined learned value gain Kln_HP is set such that 0<Kln_HP<1 holds, the HP-side local correction learned value CorMAP_HP_local_ij is calculated such that as the calculation thereof proceeds (i.e. as learning proceeds), the absolute value of the HP-side FB correction value Dfb_HP is reduced. As a result, the HP-side learned value CorMAP_HP is calculated such that the absolute value of the HP-side FB correction value Dfb_HP is reduced.

Further, when the LP ratio R_LP+0 holds, i.e. when recirculation of exhaust gases by both of the LP-EGR device 11 and the HP-EGR device 12 is being performed, or when recirculation of exhaust gases only by the LP-EGR device 11 is being performed, the HP-side local correction learned value CorMAP_HP_local_ij is calculated by the equations (19) and (21), and hence is held at an immediately preceding value thereof without being updated.

Furthermore, the aforementioned HP-side correction coefficient calculation section 68 calculates the HP-side correction coefficient Kcor_HP by the following equation (23):

[Math 23]

$$K\text{cor\_HP}(k)=1+D\textit{fb}\_HP(k)+\text{CorMAP\_HP}(k) \qquad (23)$$

Next, a description will be given of the above-mentioned target opening calculation section 70 (target opening degree calculation means). The target opening calculation section 70 calculates the target LP opening θ_LP_dmd serving as a target of the LP opening θ_LP and the target HP opening θ_HP_dmd serving as a target of the HP opening θ_HP, by a method described hereinafter. Note that in the present embodiment, the target LP opening θ_LP_dmd corresponds to a target low-pressure EGR opening degree and a correlation parameter, and the target HP opening θ_HP_dmd corresponds to a target high-pressure EGR opening degree and a correlation parameter.

Figure 11:
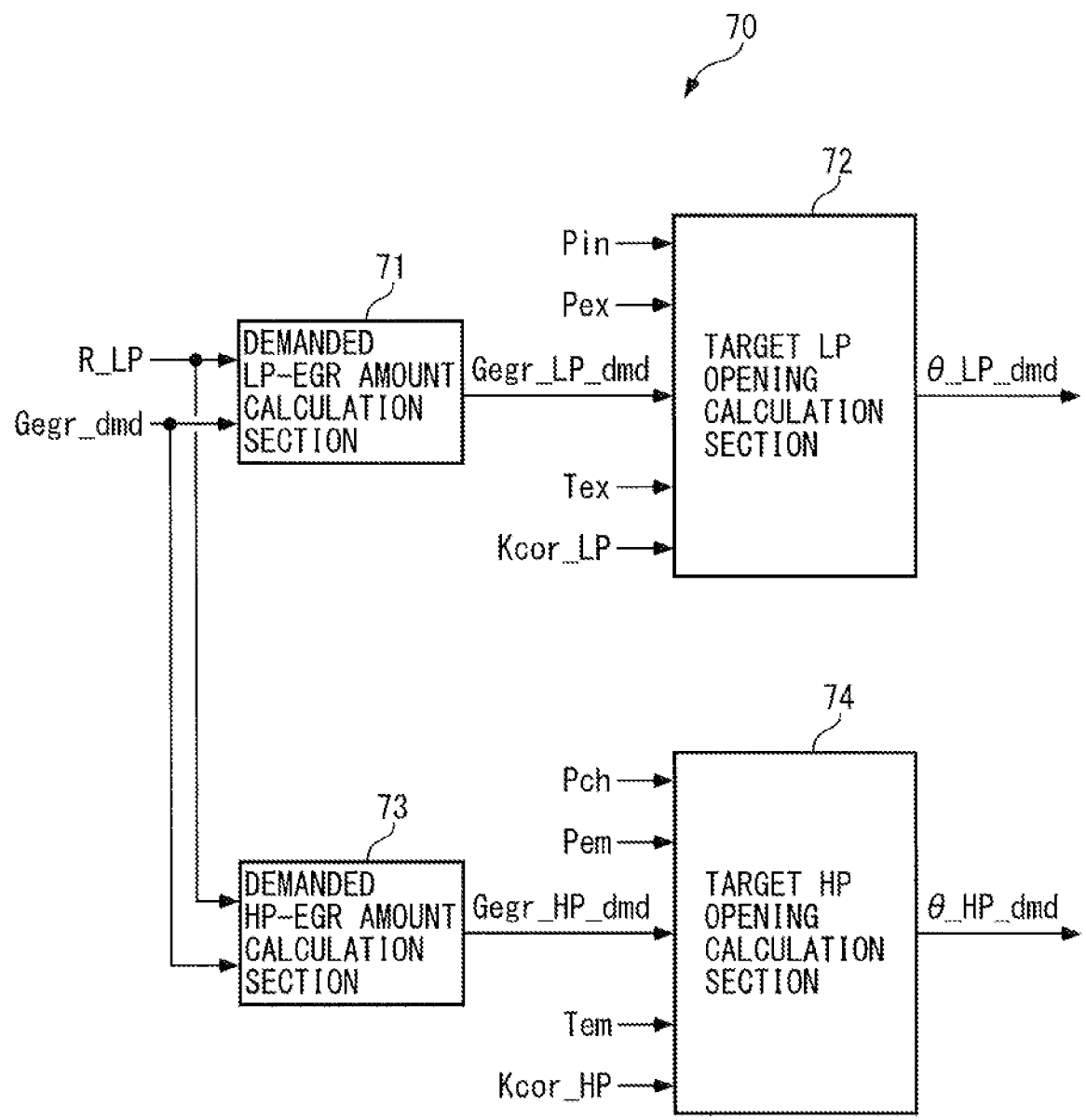
FIG. 11 A block diagram showing the functional configuration of a target opening calculation section.

As shown in FIG. 11, the target opening calculation section 70 includes a demanded LP-EGR amount calculation section 71, a target LP opening calculation section 72, a demanded HP-EGR amount calculation section 73, and a target HP opening calculation section 74.

In the demanded LP-EGR amount calculation section 71, a demanded LP-EGR amount Gegr_LP_dmd is calculated by the following equation (24):

[Math 24]

$$G\text{egr\_LP\_dmd}(k)=R\_LP(k)\cdot G\text{egr\_dmd}(k) \qquad (24)$$

Further, in the target LP opening calculation section 72, first, a target LP effective opening A_LP_dmd is calculated by the following equation (25):

[Math 25]

$$A\_LP\_dmd(k) = \frac{K\text{cor\_LP}(k) \cdot G\text{egr\_LP\_dmd}(k)}{\left\{ \frac{Pin(k)}{\sqrt{R \cdot Tex(k)}} \cdot \sqrt{\frac{2\kappa}{\kappa-1} \cdot \left(Rp\_LP(k)^{\frac{2}{\kappa}} - Rp\_LP(k)^{\frac{\kappa+1}{\kappa}}\right)} \right\}} \qquad (25)$$

Figure 12:
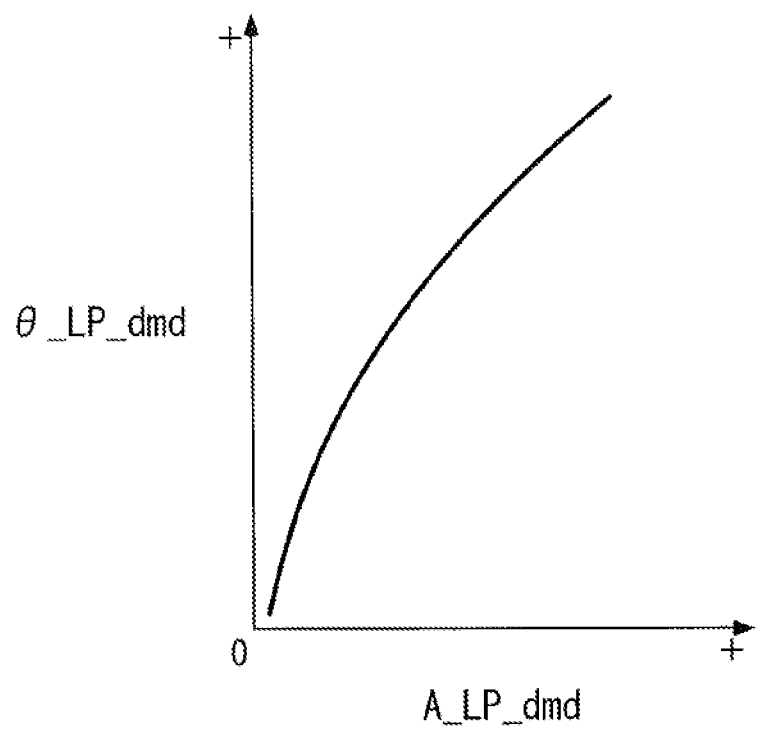
FIG. 12 A diagram showing an example of a map for use in calculating a target LP opening.

Next, the target LP opening θ_LP_dmd is calculated by searching a map shown in FIG. 12 according to the target LP effective opening A_LP_dmd.

On the other hand, in the demanded HP-EGR amount calculation section 73, a demanded HP-EGR amount Gegr_HP_dmd is calculated by the following equation (26):

[Math 26]

$$G\text{egr\_HP\_dmd}(k)=[1-R\_LP(k)]\cdot G\text{egr\_dmd}(k) \qquad (26)$$

Further, in the target HP opening calculation section 74, first, a target HP effective opening A_HP_dmd is calculated by the following equation (27):

[Math 27]

$$A\_HP\_dmd(k) = \frac{K\text{cor\_HP}(k) \cdot G\text{egr\_HP\_dmd}(k)}{\left\{ \frac{Pch(k)}{\sqrt{R \cdot Tem(k)}} \cdot \sqrt{\frac{2\kappa}{\kappa-1} \cdot \left(Rp\_HP(k)^{\frac{2}{\kappa}} - Rp\_HP(k)^{\frac{\kappa+1}{\kappa}}\right)} \right\}} \qquad (27)$$

Next, the target HP opening θ_HP_dmd is calculated by searching a map which defines a relationship between the same and the target HP effective opening A_HP_dmd. In this case, as the map, there is used a map which is obtained by replacing the target LP opening θ_LP_dmd on a vertical axis in FIG. 12 with the target HP opening θ_HP_dmd, and the target LP effective opening area A_LP_dmd on a horizontal axis in FIG. 12 with the target HP effective opening area A_HP_dmd, and in which the relationship between the two 0 is set to have the same tendency as in FIG. 12.

On the other hand, in the above-mentioned opening controller 80 (EGR control means), a LP control input U_LP is calculated with a predetermined control algorithm such that the LP opening θ_LP becomes equal to the target LP opening θ_LP_dmd, and a HP control input U_HP is calculated with a predetermined control algorithm such that the HP opening θ_HP becomes equal to the target HP opening θ_HP_dmd.

In the case of the EGR control apparatus 1, when the control inputs U_LP and U_HP are calculated as described above, control input signals associated with the control inputs U_LP and U_HP are supplied from the ECU 2 to the LP-EGR valve 11c and the HP-EGR valve 12c, respectively. As a result, the LP opening θ_LP is controlled such that it becomes equal to the target LP opening θ_LP_dmd, and the HP opening θ_HP is controlled such that it becomes equal to the target HP opening θ_HP_dmd.

Figure 13:
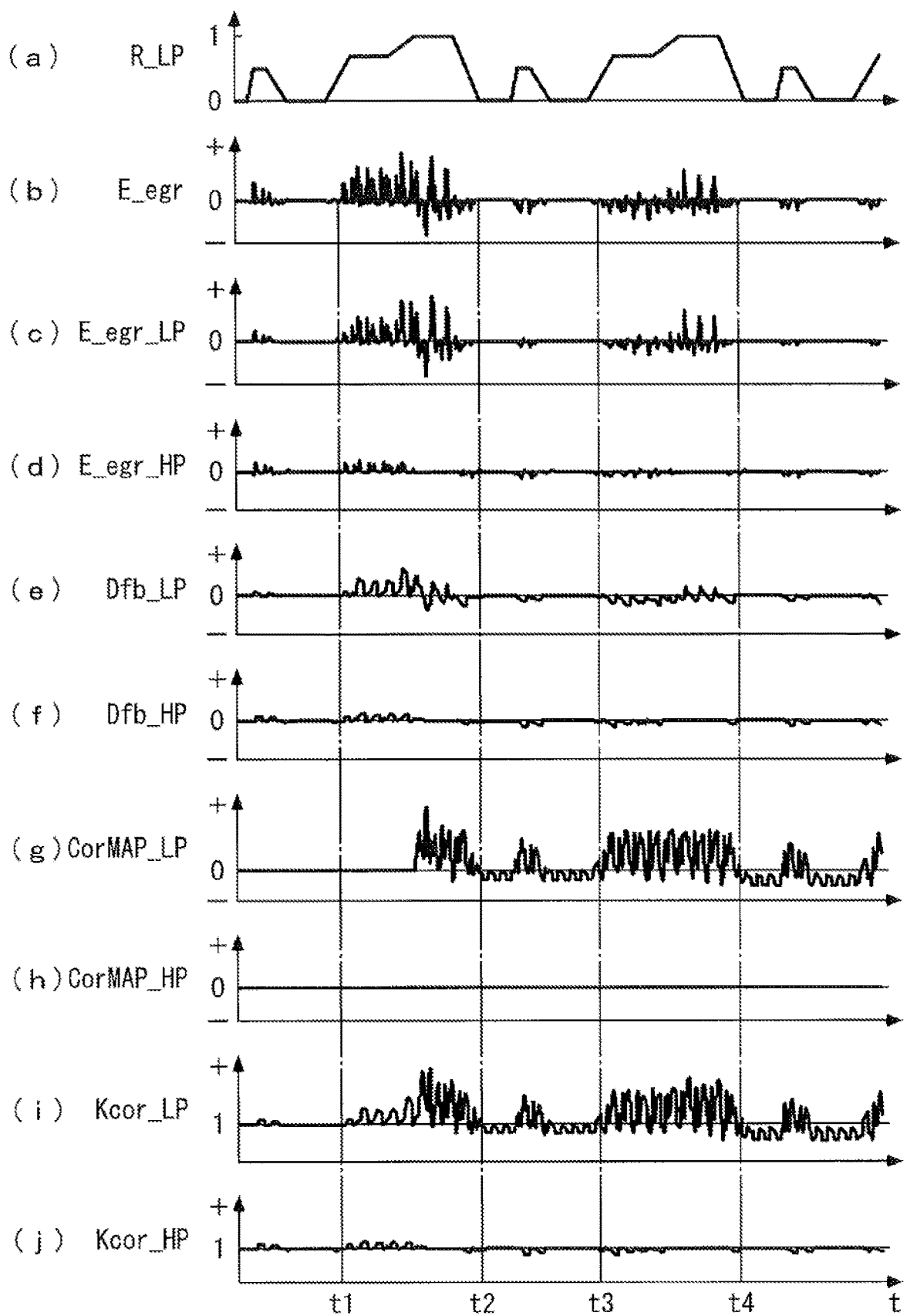
FIG. 13 A diagram showing an example of results of a simulation of control performed when an EGR amount error has occurred only due to a malfunction of a LP-EGR device during execution of EGR control by the EGR control apparatus according to the present embodiment.

Next, with reference to FIGS. 13 and 14, a description will be given of the principles and effects of the EGR control which is performed by the EGR control apparatus 1 according to the present embodiment configured as described above. FIG. 13 shows an example of results of a control simulation (hereinafter referred to as the "present control results") performed when an EGR amount error E_egr has occurred only due to a malfunction of the LP-EGR device 11 (e.g. sticking of sludge and the like) during execution of the EGR control by the EGR control apparatus 1.

Figure 14:
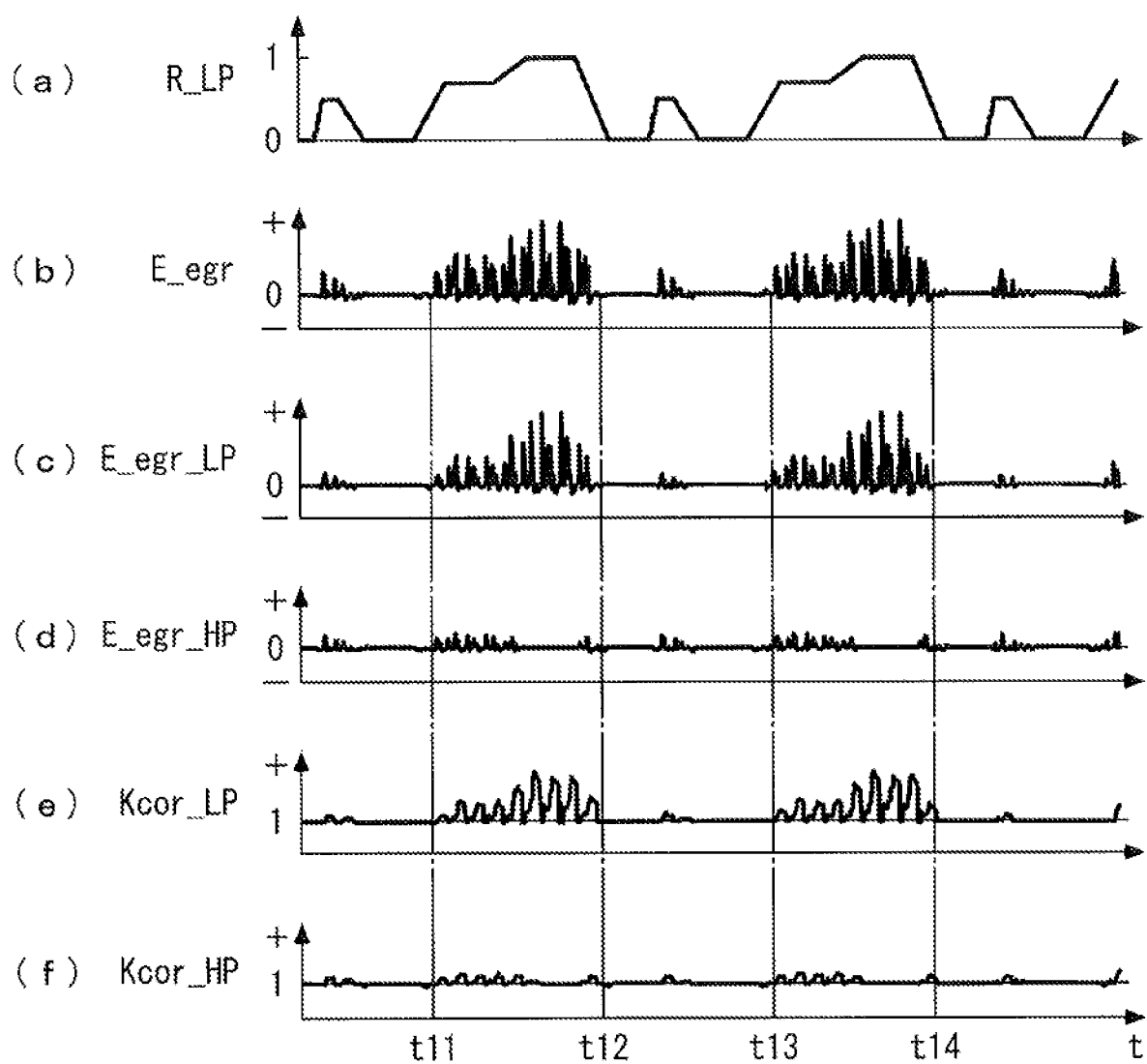
FIG. 14 A timing diagram showing, for comparison, an example of results of a simulation of EGR control performed when an EGR amount error has occurred only due to a malfunction of the LP-EGR device in a case where in a control algorithm of the EGR control apparatus, a LP-side learned value and a HP-side learned value in equations for calculating a LP-side correction coefficient and a HP-side correction coefficient are omitted.

Further, FIG. 14 shows, for comparison, an example of results of a control simulation (hereinafter referred to as the "comparative control results") performed when an EGR amount error E_egr has occurred only due to a malfunction of the LP-EGR device 11 in a case where in the aforementioned equations (15) and (23) for calculating the LP-side correction coefficient Kcor_LP and the HP-side correction coefficient Kcor_HP, the LP-side learned value CorMA- P_LP and the HP-side learned value CorMAP_HP are omitted (i.e. in a case where Kcor_LP=1+Dfb_LP and Kcor_HP=1+Dfb_HP).

First, referring to the comparative control results shown in FIG. 14, it is understood that e.g. in a case where at time periods of t11 to t12 and t13 to t14, the LP ratio R_LP rises in the same manner to increase the LP_EGR amount, whereby the absolute value of the EGR amount error E_egr increases in the same manner, there occurs not only fluctuation of the LP-side correction coefficient Kcor_LP but also fluctuation of the HP-side correction coefficient Kcor_HP, and at the two time periods, erroneous correction of the HP_EGR amount repeatedly occurs in spite of the fact that the HP-EGR device 12 is normal.

In contrast, referring to the present control results shown in FIG. 13, it is understood that as time elapses, and learning of the LP-side learned value CorMAP_LP proceeds, not only the absolute values of the EGR amount error E_egr and the LP-side FB correction value Dfb_LP are reduced but also the degree of fluctuation of the HP-side correction coefficient Kcor_HP is reduced, whereby it is possible to suppress erroneous correction of the HP_EGR amount. For example, in a case where a comparison is made between a time period of t1 to t2 and a time period of t3 to t4, although the LP ratio R_LP rises in the same manner at the two time periods, the absolute values of the EGR amount error E_egr and the LP-side FB correction value Dfb_LP are reduced and the degree of the change in the HP-side correction coefficient Kcor_HP is reduced at the time period of t3 to t4 compared with the time period of t1 to t2.

This is for the following reason: As shown in the comparative control results, in the case of a control method in which the LP-side correction coefficient Kcor_LP is calculated as the sum of a value of 1 and the LP-side FB correction value Dfb_LP, and the HP-side correction coefficient Kcor_HP is calculated as the sum of a value of 1 and the HP-side FB correction value Dfb_HP, when the engine 3 is in a steady operating state, even under a condition that a malfunction of the LP-EGR device 11 and/or a malfunction of the HP-EGR device 12 have/has occurred, it is possible to accurately control the total EGR amount by feedback control effects by the two FB correction values Dfb_LP and Dfb_HP, thereby making it possible to realize the EGR amount error E_egr #0.

However, in the case of this control method, when the engine 3 is in a transient operating state, feedback control by the LP-side FB correction value Dfb_LP and feedback control by the HP-side FB correction value Dfb_HP interfere with each other, which increases the EGR amount error E_egr, and lowers the accuracy of the EGR control. In addition to this, a ratio between the LP-EGR amount and the HP-EGR amount deviates from an optimum value (optimum value demanded based on the operating state of the engine 3), whereby the control accuracy of the air-fuel ratio is also lowered.

On the other hand, in the case of the control method of the present embodiment, as is apparent from the aforementioned equations (11) to (14), the LP-side learned value CorMAP_LP included in the equation (15) for calculating the LP-side correction coefficient Kcor_LP is updated when the LP ratio R_LP=1.0, i.e. when exhaust gases are recirculated only by the LP-EGR device 11, and hence it is possible to ensure high learning accuracy.

In addition to this, as shown in the equation (11), the LP-side local correction learned value CorMAP_LP_local_ij of the LP-side learned value CorMAP_LP is calculated by adding the total sum of respective products of the predetermined learned value gain Kln_LP, the LP opening weight functions Wp_LP_i, the LP-side flow rate weight functions Wf_LP_j, and the LP-side correction-use error signal Eln_LP, to the immediately preceding value CorMAP_LP_local_ij(k−1) of the LP-side local correction learned value.

Therefore, when the LP-side learned value CorMAP_LP is updated, the LP-side local correction learned value CorMAP_LP_local_ij is calculated in a state in which correlations with values of the target LP opening θ_LP_dmd and the LP-side flow rate parameter Sf_LP at the control time are reflected on the LP-side FB correction value Dfb_LP for correcting the EGR amount error E_egr at the control time. Further, since the learned value gain Kln_LP is set such that 0<Kln_LP<1 holds, the LP-side local correction learned value CorMAP_LP_local_ij is calculated as such a value having a feedforward control function that reduces the absolute value of the LP-side FB correction value Dfb_LP.

Further, the LP-side learned value CorMAP_LP is calculated as the total sum of respective products of the LP-side local correction learned value CorMAP_LP_local_ij thus calculated and the two weight functions Wp_LP_i and Wf_LP_j, and hence is calculated such that it does not interfere with the LP-side FB correction value Dfb_LP. When the LP-side local correction learned value CorMAP_LP_local_ij is not updated, the LP-side learned value CorMAP_LP provides the same principle of calculation by searching a map for calculating the LP-side learned value CorMAP_LP according to the target LP opening θ_LP_dmd and the LP-side flow rate parameter Sf_LP.

On the other hand, as is apparent from the aforementioned equations (19) to (23), the HP-side correction coefficient Kcor_HP is updated when the LP ratio R_LP=0, i.e. when exhaust gases are recirculated only by the HP-EGR device 12, and hence it is possible to ensure high learning accuracy.

Further, the HP-side local correction learned value CorMAP_HP_local_ij of the HP-side learned value CorMAP_HP is calculated by adding the total sum of respective products of the predetermined learned value gain Kln_HP, the HP opening weight functions Wp_HP_i, the HP-side flow rate weight functions Wf_HP_j, and the HP-side correction error signal Eln_HP, to the immediately preceding value CorMAP_HP_local_ij(k−1) of the HP-side local correction learned value.

Therefore, when the HP-side learned value CorMAP_HP is updated, the HP-side local correction learned value CorMAP_HP_local_ij is calculated in a state in which correlations with values of the target HP opening θ_HP_dmd and the HP-side flow rate at the control time parameter Sf_HP are reflected on the HP-side FB correction value Dfb_HP for correcting the EGR amount error E_egr at the control time. Further, since the learned value gain Kln_HP is set such that 0<Kln_HP<1 holds, the HP-side local correction learned value CorMAP_HP_local_ij is calculated as such a value having a feedforward control function that reduces the absolute value of the HP-side FB correction value Dfb_HP.

Further, the HP-side learned value CorMAP_HP is calculated as the total sum of respective products of the HP-side local correction learned value CorMAP_HP_local_ij thus calculated and the two weight functions Wp_HP_i and Wf_HP_j, and hence is calculated such that it does not interfere with the HP-side FB correction value Dfb_HP. When the HP-side local correction learned value CorMAP_HP_local_ij is not updated, the HP-side learned value CorMAP_HP provides the same principle of calculation by searching a map for calculating the HP-side learned value CorMAP_HP according to the target HP opening θ_HP_dmd and the HP-side flow rate parameter Sf_HP.

Therefore, by using the LP-side correction coefficient Kcor_LP and the HP-side correction coefficient Kcor_HP calculated as above, differently from the above-described control apparatus disclosed in PTL 1, it is possible to control the ratio between the LP-EGR amount and the HP-EGR amount to the optimum value even in the case where the engine 3 is in the steady operating state or in the transient operating state, whereby it is possible to control the air-fuel ratio to an optimum value. As a result, both of reduction performance of harmful ingredients (NOx) of exhaust gases and fuel economy performance are improved.

Particularly, the LP-side learned value CorMAP_LP included in the LP-side correction coefficient Kcor_LP is calculated such that it does not interfere with the LP-side FB correction value Dfb_LP, and the HP-side learned value CorMAP_HP included in the HP-side correction coefficient Kcor_HP is calculated such that it does not interfere with the HP-side FB correction value Dfb_HP, and hence even when the engine 3 is in the transient operating state, it is possible to positively obtain the above-described operations and effects.

Figure 15:
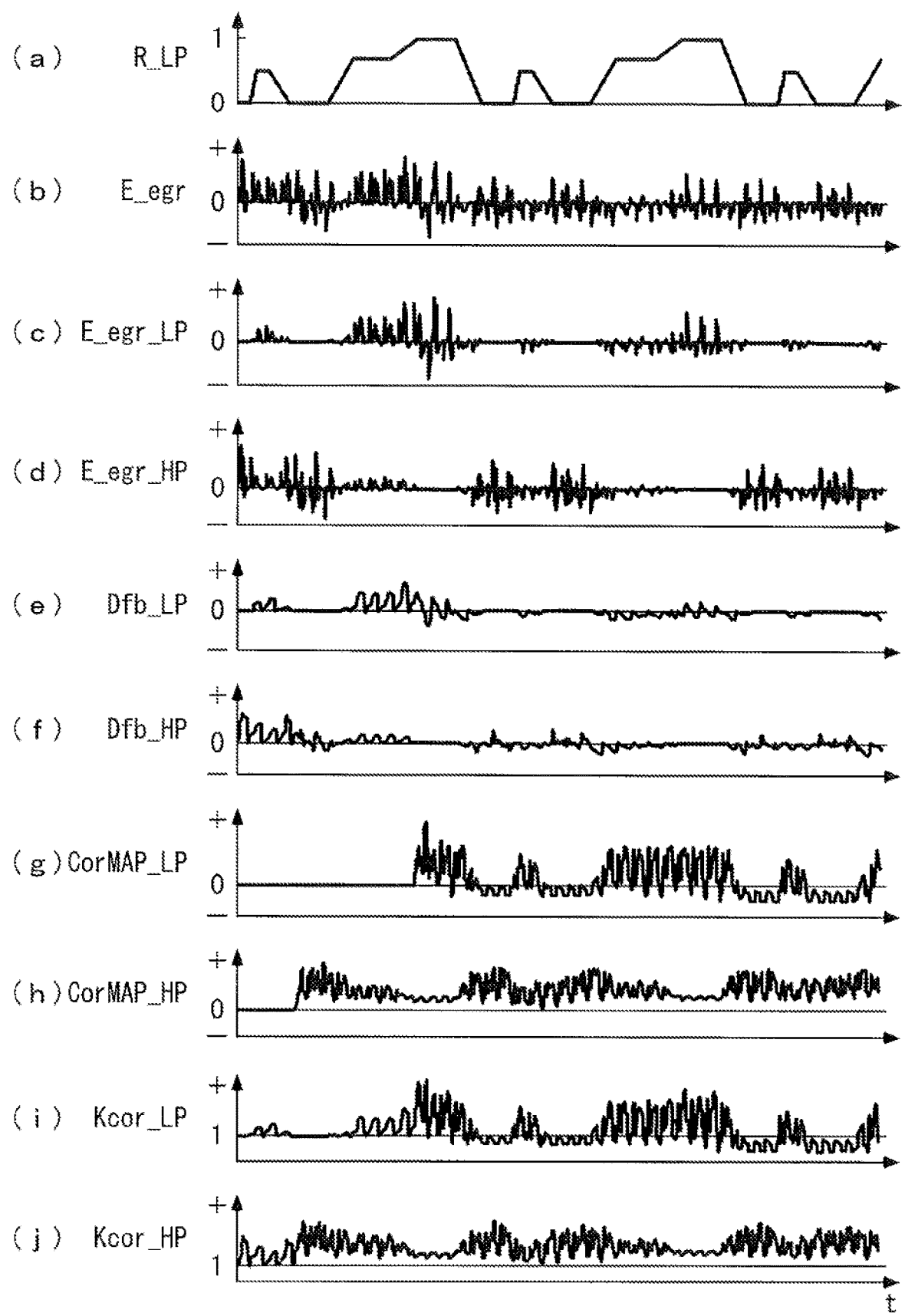
FIG. 15 A diagram showing an example of results of a simulation of control performed when an EGR amount error has occurred due to malfunctions of both the LP-EGR device and a HP-EGR device during execution of the EGR control by the EGR control apparatus according to the present embodiment.

Based on the above-described principles, according to the EGR control apparatus 1 and the EGR control method of the present embodiment, even when the EGR amount error E_egr has occurred due to malfunctions of both of the LP-EGR device 11 and the HP-EGR device 12, it is possible to obtain control results shown in FIG. 15. As is apparent by reference to these control results, it is understood that as time elapses and learning of the LP-side learned value CorMAP_LP and the HP-side learned value CorMAP_HP proceeds, the absolute value of the EGR amount error E_egr progressively decreases, and at the same time, the absolute values of the two FB correction values Dfb_LP and Dfb_HP as well decrease. That is, it is understood that by using the LP-side correction coefficient Kcor_LP and the HP-side correction coefficient Kcor_HP, it is possible to accurately control the LP-EGR amount and the HP-EGR amount.

As described hereinabove, according to the EGR control apparatus 1 and the EGR control method of the present embodiment, since the LP-side correction coefficient Kcor_LP and the HP-side correction coefficient Kcor_HP are calculated by the above-described control method, it is possible to accurately control the EGR amounts by the LP-EGR device 11 and the HP-EGR device 12, whereby it is possible to improve both of reduction performance of harmful ingredients (NOx) of exhaust gases and fuel economy performance.

Further, the LP-side FB correction value Dfb_LP is calculated such that the absolute value of the LP-side correction-use error E_egr_LP is reduced, whereas the LP-side learned value CorMAP_LP is calculated such that the absolute value of the LP-side FB correction value Dfb_LP is reduced, while causing the correlations with the target LP opening θ_LP_dmd and the LP-side flow rate parameter Sf_LP to be reflected thereon, and hence even when the engine 3 is in the transient operating state, the LP-side learned value CorMAP_LP can be calculated such that the absolute value of the LP-side correction-use error E_egr_LP is reduced, while avoiding mutual interference between the LP-side learned value CorMAP_LP and the LP-side FB correction value Dfb_LP.

Similar to this, the HP-side FB correction value Dfb_HP is calculated such that the absolute value of the HP-side correction error E_egr_HP is reduced, whereas the HP-side learned value CorMAP_HP is calculated such that the absolute value of the HP-side FB correction value Dfb_HP is reduced, while causing the correlations with the target HP opening θ_HP_dmd and the HP-side flow rate parameter Sf_HP to be reflected thereon, and hence even when the engine 3 is in the transient operating state, the HP-side learned value CorMAP_HP can be calculated such that the absolute value of the HP-side correction error E_egr_HP is reduced, while avoiding mutual interference between the HP-side learned value CorMAP_HP and the HP-side FB correction value Dfb_HP.

Furthermore, the LP-side learned value CorMAP_LP is calculated by multiplying the LP-side local correction learned value CorMAP_LP_local_ij by the two weight functions Wp_LP_i and Wf_LP_j in which the relationships thereof with the target LP opening θ_LP_dmd and the LP-side flow rate parameter Sf_LP, each having a correlation with the total EGR amount, are defined, respectively. The HP-side learned value CorMAP_HP is calculated by multiplying the HP-side local correction learned value CorMAP_HP_local_ij by the two weight functions Wp_HP_i and Wf_HP_j in which the relationships thereof with the target HP opening θ_HP_dmd and the HP-side flow rate parameter Sf_HP, each having a correlation with the total EGR amount, are defined, respectively.

As a result, in the case where recirculation of exhaust gases by both of the LP-EGR device 11 and the HP-EGR device 12 is being performed, even when the two local correction learned values CorMAP_LP_local_ij and CorMAP_HP_local_ij cannot be updated in spite of a required total EGR amount being in a varying state due to the transient operating state of the engine 3, it is possible to accurately calculate the two learned values CorMAP_LP and CorMAP_HP as values reflecting the correlations with the two target openings θ_LP_dmd and θ_HP_dmd and the two flow rate parameters Sf_LP and Sf_HP, by a method substantially similar to the map search method. From the above, even when the engine 3 is in the transient operating state, it is possible to control the EGR amounts by the LP-EGR device 11 and the HP-EGR device 12 with high accuracy, whereby it is possible to ensure both of reduction performance of harmful ingredients (NOx) of exhaust gases and fuel economy performance at a high level.

Although the present embodiment is an example in which the LP-side correction coefficient Kcor_LP as the low pressure-side correction value and the HP-side correction coefficient Kcor_HP as the high pressure-side correction value are configured such that each of them includes an FB correction value (Dfb_LP, Dfb_HP) and a learned value (CorMAP_LP, CorMAP_HP), the configuration may be such that one of the low pressure-side correction value and the high pressure-side correction value includes an FB correction value and a learned value.

Further, although the present embodiment is an example in which the EGR amount error E_egr is used as the error parameter, the error parameter of the present invention is not limited to this, but any suitable error parameter may be employed insofar as it represents an error of the amount of gases recirculated via the low-pressure EGR valve and the high-pressure EGR valve. For example, a ratio between the aforementioned in-cylinder fresh air amount Gair_cyl_act and estimated in-cylinder fresh air amount Gair_cyl_hat may be used as the error parameter. In this case, if the low pressure-side correction value and the high pressure-side correction value are calculated such that the ratio becomes equal to 1, it is possible to reduce the absolute value of the error.

Furthermore, although the present embodiment is an example in which the LP ratio R_LP is used as the ratio of the low-pressure EGR amount to the total EGR amount, the ratio of the low-pressure EGR amount to the total EGR amount of the present invention is not limited to this, but any suitable ratio may be employed insofar as it represents the ratio of the low-pressure EGR amount to the total EGR amount. For example, a value obtained by converting the LP ratio R_LP to a percentage.

On the other hand, although the present embodiment is an example in which a value of 1−R_LP, which is obtained by subtracting the LP ratio R_LP from a value of 1, is used as the ratio of the high-pressure EGR amount to the total EGR amount, the ratio of the high-pressure EGR amount to the total EGR amount of the present invention is not limited to this, but any suitable ratio may be employed insofar as it represents the ratio of the high-pressure EGR amount to the total EGR amount. For example, a value obtained by converting the value of 1−R_LP to a percentage.

Further, although the present embodiment is an example in which a value of 1.0 is used as the first predetermined value, the first predetermined value of the present invention is not limited to this, but any suitable value may be employed. For example, a predetermined value close to a value of 1 (e.g. a value of 0.8) may be used as the first predetermined value, and in the equations (20) and (21), when the immediately preceding value R_LP(k−1) of the LP ratio is not larger than a value (e.g. a value of 0.2) obtained by subtracting the first predetermined value from a value of 1, that is, when the ratio of the HP-EGR amount to the total EGR amount is not smaller than a predetermined ratio (e.g. 80%), the HP-side correction error signal Eln_HP(k) may be calculated as the value Dfb_HP(k−1), and otherwise as a value of 0.

Furthermore, although the present embodiment is an example in which a value of 1.0 is used as the second predetermined value, the second predetermined value of the present invention is not limited to this, but any suitable value may be employed. For example, a predetermined value close to a value of 1.0 (e.g. a value of 0.9) may be used as the second predetermined value, and in the equations (12) and (13), when the immediately preceding value R_LP(k−1) of the LP ratio is not smaller than the second predetermined value, the LP-side correction-use error signal Eln_LP(k) may be calculated as the value Dfb_LP(k−1), and otherwise as a value of 0.

On the other hand, although the present embodiment is an example in which FIGS. 9 and 10 are used as the correlation models, the correlation models of the present invention are not limited to these, but any suitable correlation models may be employed insofar as they are correlation models each defining a relationship between at least one of a correlation parameter and a flow rate parameter and a model value. For example, mathematical expressions may be employed as the correlation models.

Further, although the present embodiment is an example in which, as shown in the equation (3), the ratio between the intake pressure Pin and the exhaust pressure Pex is used as the pressure ratio Rp_LP, the pressures on the downstream and upstream sides of the LP-EGR valve 11c may be estimated to use a ratio between the estimated pressures as the pressure ratio Rp_LP.

Furthermore, although the present embodiment is an example in which, as shown in the equation (5), the ratio between the intake chamber pressure Pch and the exhaust manifold pressure Pem is used as the pressure ratio Rp_HP, the pressures on the downstream and upstream sides of the HP-EGR valve 12c may be estimated to use a ratio between the estimated pressures as the pressure ratio Rp_HP.

Further, although the present embodiment is an example in which the EGR control apparatus and the EGR control method of the present invention are applied to the diesel engine, the EGR control apparatus and the EGR control method of the present invention are not limited to this, but can be applied to an internal combustion engine using gasoline or the like as fuel. For example, in a case where the EGR control apparatus and the EGR control method of the present invention are applied to a gasoline engine, it is possible to improve the knock suppression ability in addition to reduction performance of harmful ingredients (NOx) of exhaust gases and fuel economy performance.

On the other hand, although the present embodiment is an example in which the EGR control apparatus and the EGR control method of the present invention are applied to the internal combustion engine for a vehicle, the EGR control apparatus and the EGR control method of the present invention are not limited to this, but can be applied to internal combustion engines for boats and internal combustion engines for other industrial machines.

INDUSTRIAL APPLICABILITY

As described heretofore, the EGR control apparatus and the EGR control method for an internal combustion engine of the present invention are effective in improving the reduction performance of harmful ingredients (NOx) of exhaust gases and fuel economy performance in a case where an EGR amount is controlled by a low-pressure EGR device and a high-pressure EGR device.

REFERENCE SIGNS LIST

1 EGR control apparatus
2 ECU (error parameter calculation means, correction value calculation means, target opening degree calculation means, EGR control means)
3 internal combustion engine
3a cylinder
5 intake passage
10 exhaust passage
11 LP-EGR device (low-pressure EGR device)
11c LP-EGR valve (low-pressure EGR valve)
12 HP-EGR device (high-pressure EGR device)
12c HP-EGR valve (high-pressure EGR valve)
50 EGR amount error calculation section (error parameter calculation means)
60 correction coefficient calculation section (correction value calculation means)
70 target opening calculation section (target opening degree calculation means)
80 opening controller (EGR control means)
θ_LP LP opening (degree of opening of low-pressure EGR valve)
θ_HP HP opening (degree of opening of high-pressure EGR valve)
R_LP LP ratio (ratio of low-pressure EGR amount to total EGR amount)
E_egr EGR amount error (error parameter)
Dfb_LP LP-side FB correction value (feedback correction value)
Sf_LP LP-side flow rate parameter (flow rate parameter)
Wf_LP_i LP-side flow rate weight function (model value)
θ_LP_dmd target LP opening (target low-pressure EGR opening degree, correlation parameter)

Wp_LP_i LP opening weight function (model value)
CorMAP_LP LP-side learned value (learned value)
Kcor_LP LP-side correction coefficient (low pressure-side correction value)
Dfb_HP HP-side FB correction value (feedback correction value)
Sf_HP HP-side flow rate parameter (flow rate parameter)
Wf_HP_i HP-side flow rate weight function (model value)
θ_HP_dmd target HP opening (target high-pressure EGR opening degree, correlation parameter)
Wp_HP_i HP opening weight function (model value)
CorMAP_HP HP-side learned value (learned value)
Kcor_HP HP-side correction coefficient (high pressure-side correction value)

The invention claimed is:

1. An EGR control apparatus for an internal combustion engine in which part of exhaust gases is recirculated into an intake passage via a low-pressure EGR valve of a low-pressure EGR device, and part of the exhaust gases is recirculated into cylinders via a high-pressure EGR valve of a high-pressure EGR device, comprising:
   error parameter calculation means for calculating an error parameter indicating an error of a total EGR amount which is a total sum of a low-pressure EGR amount as an amount of gasses recirculated by said low-pressure EGR device and a high-pressure EGR amount as an amount of gasses recirculated by said high-pressure EGR device;
   correction value calculation means for calculating a low pressure-side correction value and a high pressure-side correction value such that an absolute value of the error of the total EGR amount indicated by the error parameter is reduced;
   target opening degree calculation means for calculating a target low-pressure EGR opening degree serving as a target of a degree of opening of the low-pressure EGR valve, and a target high-pressure EGR opening degree as a target of a degree of opening of the high-pressure EGR valve, using the low pressure-side correction value and the high pressure-side correction value, respectively; and
   EGR control means for controlling the degree of opening of the low-pressure EGR valve and the degree of opening of the high-pressure EGR valve such that the degree of opening of the low-pressure EGR valve and the degree of opening of the high-pressure EGR valve become equal to the target low-pressure EGR opening degree and the target high-pressure EGR opening degree, respectively,
   wherein at least one of the low pressure-side correction value and the high pressure-side correction value is configured to include a feedback correction value that is calculated using a predetermined feedback control algorithm such that an absolute value of the error is reduced, and a learned value that is learned when a ratio between the low-pressure EGR amount and the high-pressure EGR amount in the total EGR amount is in a predetermined state.

2. The EGR control apparatus according to claim 1, wherein the high pressure-side correction value is configured to include the feedback correction value and the learned value, and
   wherein the predetermined state is a state in which a ratio of the high-pressure EGR amount to the total EGR amount is not smaller than a first predetermined value.

3. The EGR control apparatus according to claim 1, wherein the low pressure-side correction value is configured to include the feedback correction value and the learned value, and
   wherein the predetermined state is a state in which a ratio of the low-pressure EGR amount to the total EGR amount is not smaller than a second predetermined value.

4. The EGR control apparatus according to claim 1, wherein the learned value is calculated such that an absolute value of the feedback correction value is reduced.

5. The EGR control apparatus according to claim 1, wherein the learned value is calculated using a model value that is calculated from a correlation model defining a relationship between at least one pair of a pair of correlation parameters having correlations with the high-pressure EGR amount and the low-pressure EGR amount, respectively, and a pair of flow rate parameters having correlations with the high-pressure EGR amount and the low-pressure EGR amount, respectively, and the model value.

6. An EGR control method for an internal combustion engine in which part of exhaust gases is recirculated into an intake passage via a low-pressure EGR valve of a low-pressure EGR device, and part of the exhaust gases is recirculated into cylinders via a high-pressure EGR valve of a high-pressure EGR device, comprising:
   calculating an error parameter indicating an error of a total EGR amount which is a total sum of a low-pressure EGR amount as an amount of gasses recirculated by said low-pressure EGR device and a high-pressure EGR amount as an amount of gasses recirculated by said high-pressure EGR device;
   calculating a low pressure-side correction value and a high pressure-side correction value such that an absolute value of the error of the total EGR amount indicated by the error parameter is reduced;
   calculating a target low-pressure EGR opening degree serving as a target of a degree of opening of the low-pressure EGR valve, and a target high-pressure EGR opening degree as a target of a degree of opening of the high-pressure EGR valve, using the low pressure-side correction value and the high pressure-side correction value, respectively; and
   controlling the degree of opening of the low-pressure EGR valve and the degree of opening of the high-pressure EGR valve such that the degree of opening of the low-pressure EGR valve and the degree of opening of the high-pressure EGR valve become equal to the target low-pressure EGR opening degree and the target high-pressure EGR opening degree, respectively,
   wherein at least one of the low pressure-side correction value and the high pressure-side correction value is configured to include a feedback correction value that is calculated using a predetermined feedback control algorithm such that an absolute value of the error is reduced, and a learned value that is learned when a ratio between the low-pressure EGR amount and the high-pressure EGR amount in the total EGR amount is in a predetermined state.

7. The EGR control method according to claim 6, wherein the high pressure-side correction value is configured to include the feedback correction value and the learned value, and
   wherein the predetermined state is a state in which a ratio of the high-pressure EGR amount to the total EGR amount is not smaller than a first predetermined value.

8. The EGR control method according to claim 6, wherein the low pressure-side correction value is configured to include the feedback correction value and the learned value, and wherein the predetermined state is a state in which a ratio of the low-pressure EGR amount to the total EGR amount is not smaller than a second predetermined value.

9. The EGR control method according to claim 6, wherein the learned value is calculated such that an absolute value of the feedback correction value is reduced.

10. The EGR control method according to claim 6, wherein the learned value is calculated using a model value that is calculated from a correlation model defining a relationship between at least one pair of a pair of correlation parameters having correlations with the high-pressure EGR amount and the low-pressure EGR amount, respectively, and a pair of flow rate parameters having correlations with the high-pressure EGR amount and the low-pressure EGR amount, respectively, and the model value.

* * * * *